US012658073B2

(12) United States Patent
Zhou et al.

(10) Patent No.: US 12,658,073 B2
(45) Date of Patent: Jun. 16, 2026

(54) BIONIC SPINAL MODEL

(71) Applicants: Qingdao University, Qingdao (CN); Qingdao University of Science and Technology, Qingdao (CN); Ocean University of China, Qingdao (CN)

(72) Inventors: Chuanli Zhou, Qingdao (CN); Derong Xu, Qingdao (CN); Tao Zhuang, Qingdao (CN); Meng Qiu, Qingdao (CN); Qinguang You, Qingdao (CN)

(73) Assignees: QINGDAO UNIVERSITY, Qingdao (CN); QINGDAO UNIVERSITY OF SCIENCE AND TECHNOLOGY, Qingdao (CN); OCEAN UNIVERSITY OF CHINA, Qingdao (CN)

( * ) Notice: Subject to any disclaimer, the term of this patent is extended or adjusted under 35 U.S.C. 154(b) by 0 days.

(21) Appl. No.: 19/333,421

(22) Filed: Sep. 19, 2025

(65) Prior Publication Data
US 2026/0087943 A1      Mar. 26, 2026

(30) Foreign Application Priority Data

Sep. 20, 2024    (CN) ......................... 202411310456.8

(51) Int. Cl.
G09B 23/28        (2006.01)

(52) U.S. Cl.
CPC ......... G09B 23/286 (2013.01); G09B 23/285 (2013.01)

(58) Field of Classification Search
CPC . G09B 23/285; G09B 23/286; B29K 2075/00
See application file for complete search history.

(56) References Cited

U.S. PATENT DOCUMENTS

| | | | | |
|---|---|---|---|---|
| 2007/0027285 A1* | 2/2007 | Gunatillake | ........... | C08G 18/12 |
| | | | | 525/464 |
| 2007/0207186 A1* | 9/2007 | Scanlon | .................... | A61F 2/91 |
| | | | | 623/1.42 |
| 2023/0136935 A1* | 5/2023 | Clifton, III | .............. | B01J 23/02 |
| | | | | 434/267 |
| 2024/0359384 A1* | 10/2024 | Al-Sheyyab | .......... | B29C 70/026 |

FOREIGN PATENT DOCUMENTS

| | | | | | |
|---|---|---|---|---|---|
| CN | 109615994 A | * | 4/2019 | ............. | G09B 23/28 |
| CN | 113563713 A | * | 10/2021 | ......... | C08G 18/4072 |

* cited by examiner

*Primary Examiner* — Dmitry Suhol
*Assistant Examiner* — Alyssa N Brandley
(74) *Attorney, Agent, or Firm* — MATTHIAS SCHOLL P.C.; Matthias Scholl

(57)        ABSTRACT

A bionic spinal model, including: a base body; an enclosure; a bionic spinal body disposed on the base body and being radiopaque; a simulated muscle layer surrounding the bionic spinal body; and a simulated skin layer overlaying the simulated muscle layer. The bionic spinal body comprises an internal cavity and a bionic nerve body; the bionic nerve body is disposed in the internal cavity; and the bionic nerve body comprises a proximity-sensitive warning mechanism. The model successfully simulates key aspects of real spinal surgery, including X-ray imaging, internal anatomical structures, a surgical fluid environment, and neural proximity feedback, providing a realistic training platform to improve endoscopic spinal surgical skills.

3 Claims, 17 Drawing Sheets

BIONIC SPINAL MODEL

CROSS-REFERENCE TO RELATED APPLICATIONS

Pursuant to 35 U.S.C. § 119 and the Paris Convention Treaty, this application claims foreign priority to Chinese Patent Application No. 202411310456.8 filed Sep. 20, 2024, the contents of which, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, MA 02142.

BACKGROUND

The disclosure relates to the technical field of surgical simulation devices, and more particularly to a bionic spinal model.

Conventional training methods for spinal or partial spinal (e.g., vertebral) surgery primarily rely on anatomical specimen observation and image-based learning. While these approaches offer a fundamental understanding of spinal anatomy, they have significant limitations in simulating actual surgical procedures, addressing complex clinical scenarios, and enhancing surgical decision-making abilities. Therefore, there is a pressing need for more realistic and practice-oriented training tools to improve the proficiency of spinal endoscopic surgery. In response to this demand, various simulated spinal models have been developed for surgical skills training.

However, existing simulated spinal surgical models exhibit considerable deficiencies in realistically replicating surgical environments and the internal human environment. For instance, most current models are based on static anatomical spine structures and fail to incorporate the critical X-ray imaging step conducted prior to surgery. Furthermore, the material selection and structural design of these models are inadequate in mimicking the dynamic physiological conditions inside the human body, particularly with respect to the presence and behavior of blood, bodily fluids, and other biological elements. The spine is surrounded by a dense network of blood vessels, nerves, and various soft tissues. During surgery, precise operations are often required under exudate-rich conditions, and physiological saline irrigation is routinely used to maintain a clear surgical field. These features are not realistically represented in current models. In addition, most commercially available spinal models adopt a frame-type structure that fails to authentically reproduce the tactile feedback of human tissue, fluid dynamics, and intraoperative bleeding scenarios. Such oversimplification of the complex internal environment hinders immersive training experiences and limits the surgeon's ability to develop the skills necessary for precision operations and effective response under complex physiological conditions.

SUMMARY

To solve the aforesaid problems, the first objective of the disclosure is to provide a bionic spinal model.

The bionic spinal model comprises a base body, an enclosure, a bionic spinal body, a simulated muscle layer, and a simulated skin layer. The bionic spinal body is disposed on the base body. The simulated muscle layer surrounds the bionic spinal body. The simulated skin layer overlays the simulated muscle layer. The bionic spinal body is and is radiopaque.

The bionic spinal body comprises an internal cavity and a bionic nerve body. The bionic nerve body is disposed in the internal cavity. The bionic nerve body comprises a proximity-sensitive warning mechanism.

In a class of this embodiment, the base body comprises a support member in the shape of a trapezoid. The bionic spinal body and the simulated muscle layer are disposed within the support member.

In a class of this embodiment, the support member comprises a mounting base, two first plates, and two second plates. The mounting base is embedded within the base body. Each of the two first plates has a fan shape and is disposed at a respective opposite end of the mounting base. Each of the two second plates is inclined relative to the mounting base and disposed on an opposite side thereof. The top end of each of the two second plates comprises a third plate disposed perpendicular to the mounting base. An upper surface of each of the mounting base comprises a recessed groove configured to mate with a lower surface of the bionic spinal body, thereby ensuring the bionic spinal body in place.

In a class of this embodiment, the support member is formed integrally by foaming a polyurethane material. An upper surface of each of the two first plates is configured to conform to a curvature of a human back. Optionally, the bionic spinal body is prepared by a three-dimensional (3D) printing process. The shape and structure of the bionic spinal body is configured, as needed, to correspond to a full-sized bionic lumbar vertebra selected from the group consisting of L1, L2, L3, L4, L5, and S1. Optionally, the lumbar vertebral canal of the bionic spinal body comprises a posterior longitudinal ligament, a bionic nerve bundle, epidural fat, a ligamentum flavum, and an interspinous ligament. Optionally, a supraspinous ligament may be provided on a spinous process of the bionic lumbar vertebra.

In a class of this embodiment, an upper surface of each third plate defines a skin support surface. Opposite side portions of the simulated skin layer is disposed on a respective skin support surface. The simulated skin layer comprises a simulated fat layer and an outer epidermal layer. The simulated muscle layer is integrally formed by casting.

In a class of this embodiment, the base body further comprises a contrast cavity configured to enhance X-ray visibility, and the mounting base is disposed above the contrast cavity.

In a class of this embodiment, the support member has an interior configured to accommodate a liquid for simulating a surgical fluid environment. The support member comprises a liquid inlet and an overflow outlet. The liquid inlet is configured for fluid communication with an external water source, and the overflow outlet is configured to discharge liquid from the support member to establish a continuous liquid flow.

The second objective of the disclosure is to provide a bionic nerve body. The bionic nerve body further comprises a simulated nerve body, and the proximity-sensitive warning mechanism is disposed on the simulated nerve body.

In a class of this embodiment, the proximity-sensitive warning mechanism comprises a plurality of sensing coils, a power supply, and an external controller. The plurality of sensing coils are disposed on the simulated nerve body. The power supply is electrically connected to the plurality of sensing coils. The external controller is configured to receive a sensing signal from the plurality of sensing coils, process the sensing signal, and trigger a feedback response based on the processed signal.

In a class of this embodiment, the simulated nerve body comprises a plurality of inner tubes. Each of the plurality of sensing coils is wound around an outer wall of a respective inner tube and disposed within an outer shell.

In a class of this embodiment, when the simulated nerve body is configured as a single-channel pathway or comprises only a primary nerve, the plurality of sensing coils are each continuously wound around the outer wall of a respective inner tube.

In a class of this embodiment, when the simulated nerve body is configured as a multi-channel interconnected pathway, each segment of the plurality of sensing coils disposed between two adjacent pathway nodes and between a pathway node and a pathway end, is wound independently on the outer wall of a respective inner tube.

In a class of this embodiment, a spacing is maintained between the closest ends of every two adjacent sensing coils.

In a class of this embodiment, the simulated nerve body comprises a plurality of tubular bodies, the proximity-sensitive warning mechanism further comprises a plurality of metal sensing probes, each of the plurality of sensing coils is disposed within a respective metal sensing probe, the plurality of metal sensing probes are uniformly arranged on the inner wall of the corresponding tubular body.

In a class of this embodiment, each of the plurality of metal sensing probes is fixed to the inner wall of a respective tubular body by an adhesive or via a support bracket.

In a class of this embodiment, each of the plurality of metal sensing probes is electrically connected to the external controller through leads extending from the interior of a respective tubular body.

The third objective of the disclosure is to provide a bionic spinal body which is radiopaque. The bionic spinal body comprises a cancellous bone core and a cortical bone layer coated onto the cancellous bone core.

The fourth objective of the disclosure is to provide a method for fabricating the bionic spinal body, and the method comprises:

S1: mixing and stirring rigid polyurethane foam raw materials to form a mixture, pouring the mixture into a lumbar vertebral mold, and foaming to obtain the cancellous bone core;

S2: blending a styrene-acrylic (SA) emulsion and a styrene-acrylonitrile (SAN) emulsion to obtain a liquid material for the cortical bone layer; and S3: applying the liquid material onto an outer surface of the cancellous bone core by spraying or dipping, thereby forming the bionic spinal body for providing X-ray imaging.

In a class of this embodiment, S1 comprises:

S101: mixing, in a mixing tank, 100 parts by weight of polyether polyol, 1 part of polydimethylsiloxane (PDMS), 30 parts of 1,4-butanediol, 0.2 parts of catalyst A33, 1 part of triethanolamine, 10 parts of trimethylolpropane, and 0.8 parts of deionized water at a stirring speed of 1000 rpm until uniform;

S102: while stirring in S101, slowly adding 170 parts by weight of polymeric methylene diphenyl diisocyanate, adjusting the stirring speed to 500 rpm, and rapidly stirring for 15 seconds to form a mixture; and S103: immediately pouring the mixture into the lumbar vertebral mold, sealing the lumbar vertebral mold, and curing at 25° C. for 24 hours to form the cancellous bone core in solid form.

In a class of this embodiment, S2 comprises:

S201: mixing, in a first reactor, 10-20 parts by weight of styrene, 20-30 parts of acrylate monomer component, 0.5-1.5 parts of an emulsifier, 0.1-3.0 parts of a chain transfer agent, and 10-40 parts of deionized water to form a pre-emulsion;

S202: adding, in a second reactor, 10-60 parts by weight of deionized water, 0.5-3 parts of an initiator, 0.5-1.0 parts of an emulsifier, and 1-30 parts of a contrast agent, heating to 80° C. under stirring, and under a nitrogen atmosphere, dropwise adding the pre-emulsion prepared in S201, conducting emulsion polymerization for 1-2 hours, then cooling to room temperature to obtain the styrene-acrylic (SA) emulsion;

S203: mixing, in a third reactor, 30 parts by weight of styrene, 20 parts of acrylonitrile, 1.0 part of an emulsifier, 0.5 part of potassium persulfate, and 100 parts of deionized water, and conducting emulsion polymerization while stirring at 1000-2000 rpm to obtain the styrene-acrylonitrile (SAN) emulsion; and S204: stirring, in the second reactor, the SA emulsion prepared in S202, adding 5-40 parts by weight of the SAN emulsion prepared in S203, uniformly stirring, cooling to room temperature, and adding 0.1-1.0 parts of a pigment, thereby obtaining the liquid material for the cortical bone layer.

The following advantages are associated with the bionic nerve body of the disclosure:

1. Incorporating the contrast agent potassium iodide (KI) during emulsion synthesis ensures uniform dispersion within the emulsion. Compared to conventional coarse particulate agents, the fine distribution enhances X-ray contrast and clarity, improving identification of bone structures and lesions for accurate diagnosis and treatment planning.

2. The use of the contrast agent KI provides lower toxicity and superior biocompatibility compared to conventional high-concentration inorganic agents, reducing environmental and health risks.

3. Addition of the SAN resin enhances emulsion hardness and wear resistance, making it suitable for simulating bones of various ages and conditions, including pediatric, adult, elderly, or osteoporotic bones.

4. The colorless, transparent, and customizable SAN-modified emulsion can be used beyond medical bionic bones, including industrial non-destructive testing.

5. The tactile feedback system uses electromagnetic induction to detect the proximity of surgical instruments, providing real-time feedback during non-visible conditions.

6. The bionic spinal model replicates X-ray imaging, internal structure, surgical fluid environment, and nerve tactile feedback, offering a realistic platform for endoscopic spinal surgery training.

Figure 1:
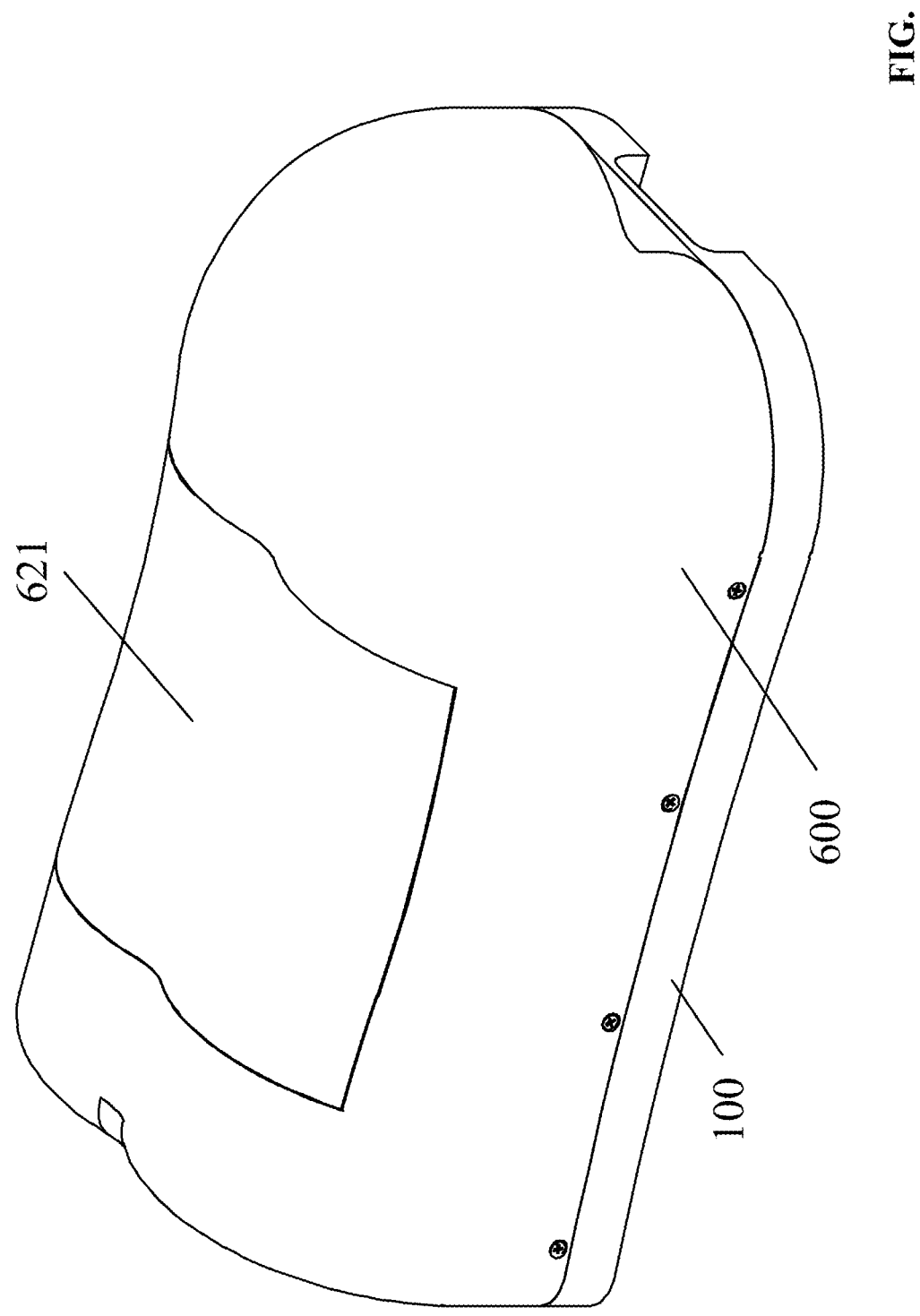
FIG. 1 is a perspective view of a bionic spinal model according to Examples 1 to 5.
Figure 2:
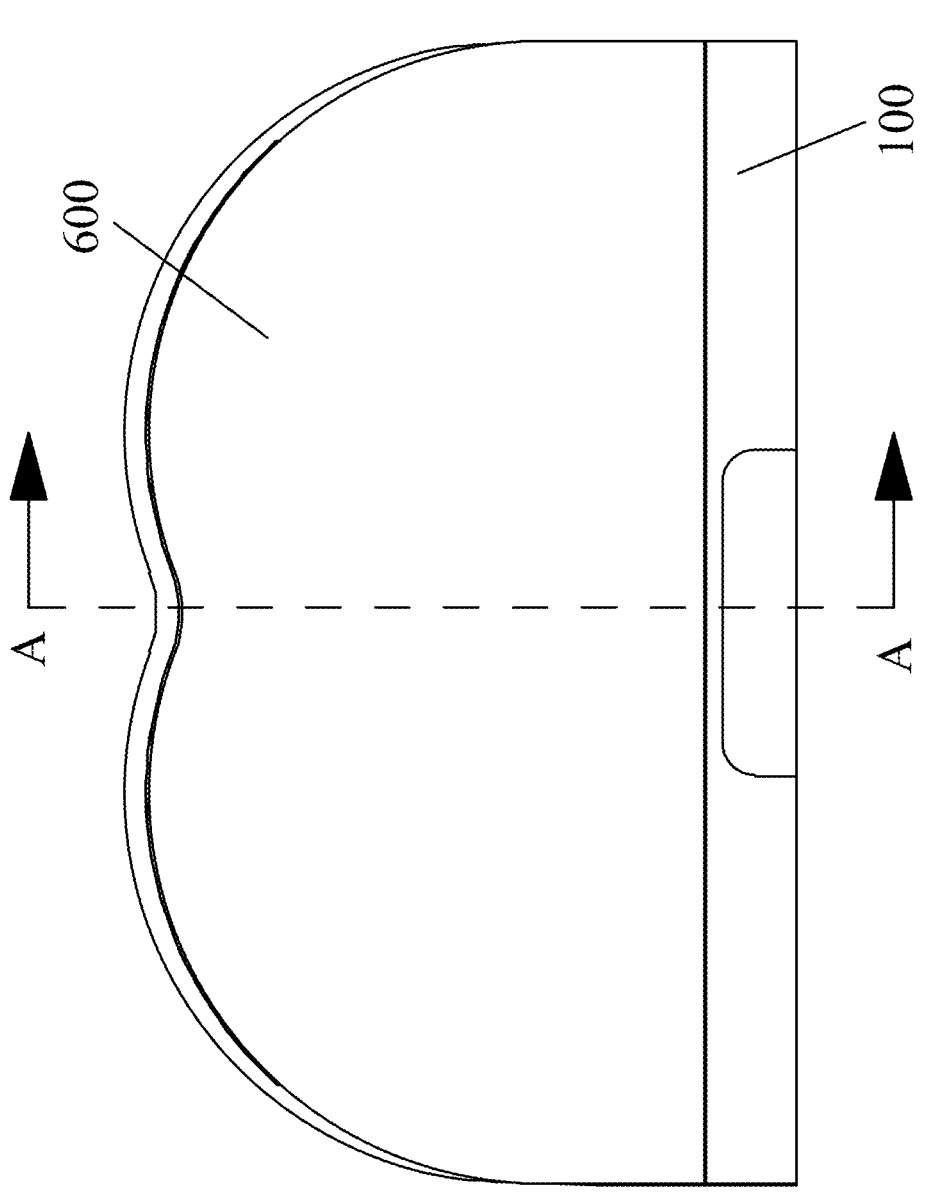
FIG. 2 is a cross-sectional view of a bionic spinal model according to Examples 1 to 5.
Figure 3:
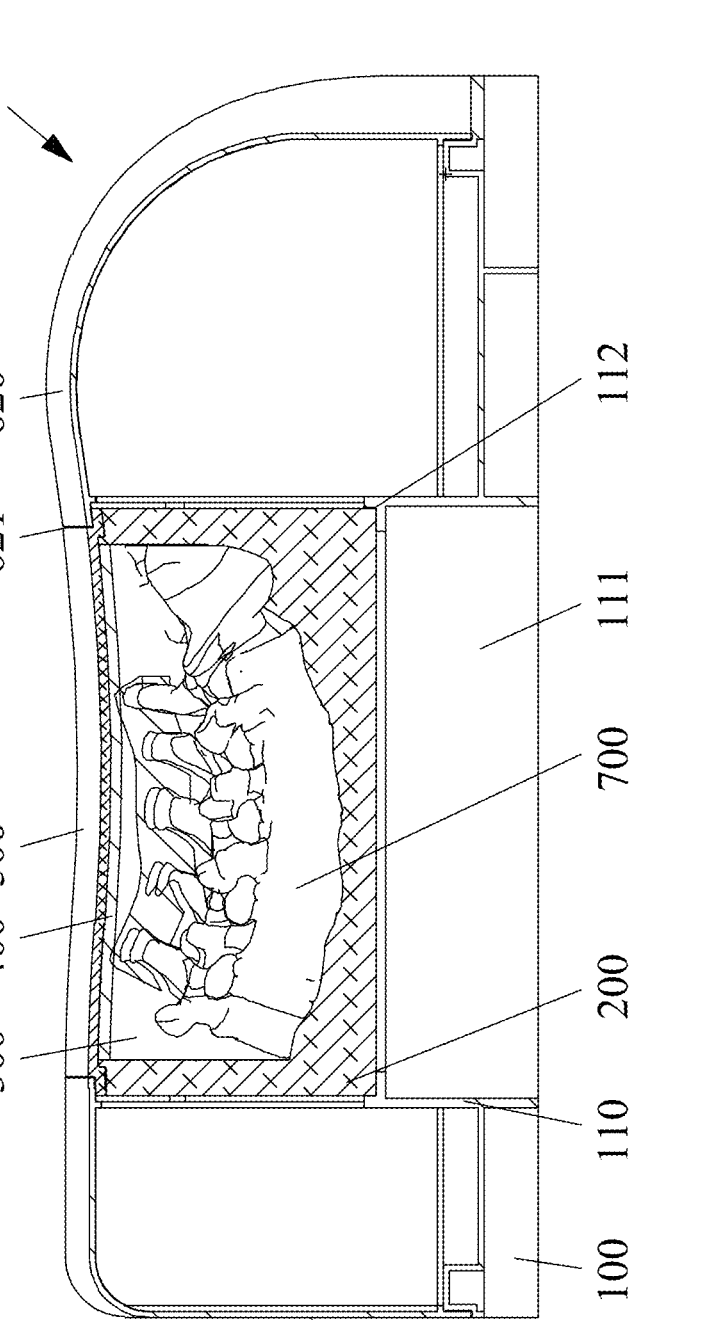
FIG. 3 is a cross-sectional view along line A-A of FIG. 2.
Figure 4:
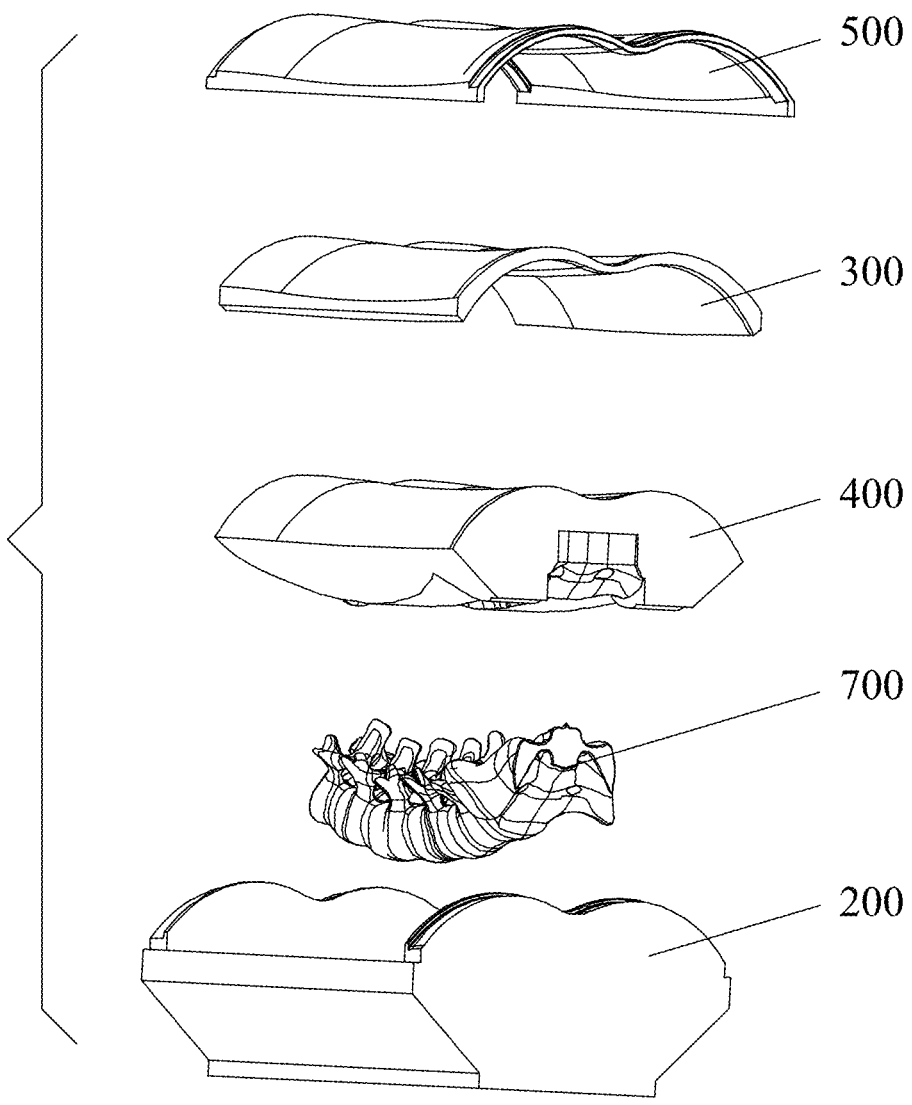
FIG. 4 is an exploded view of a bionic spinal model according to Examples 1 to 5.
Figure 5:
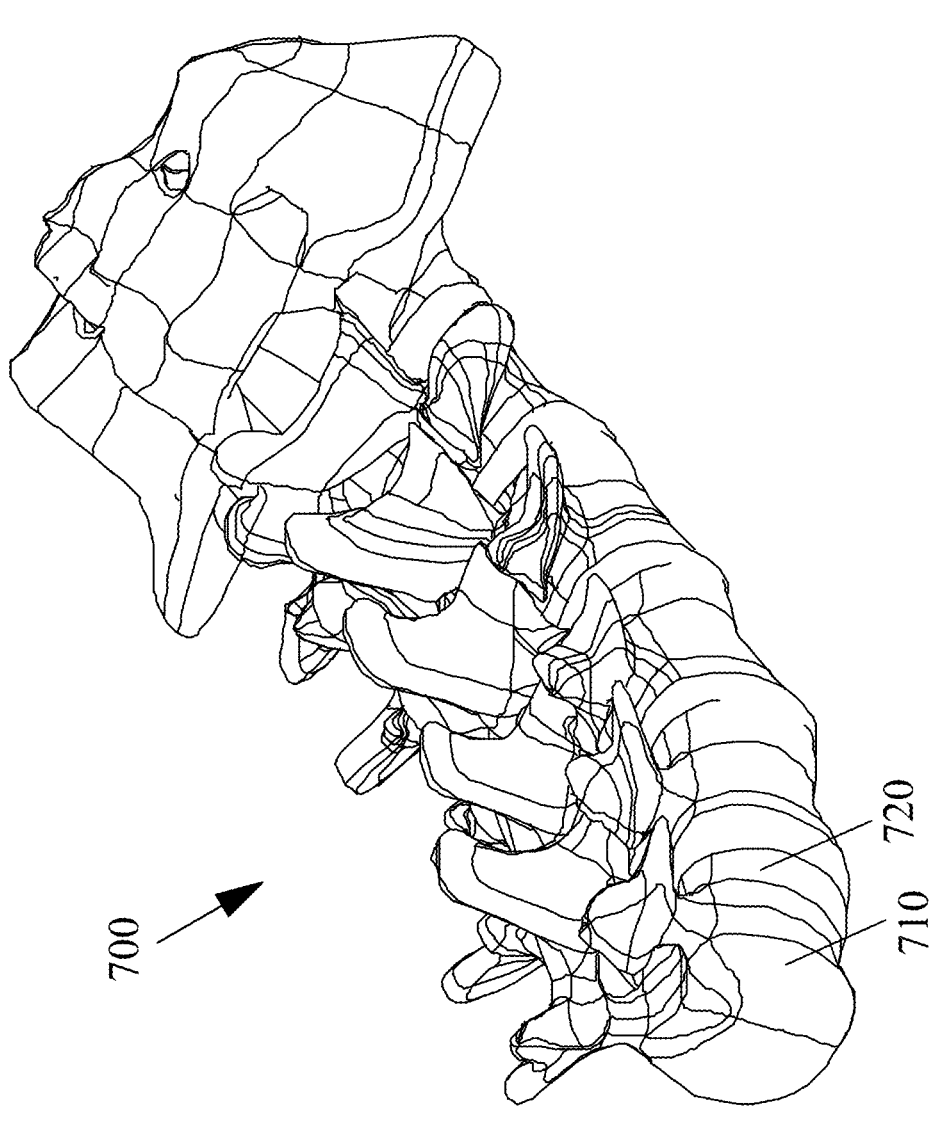
FIG. 5 is a perspective view of a bionic spinal body according to Examples 1 to 5.
Figure 6:
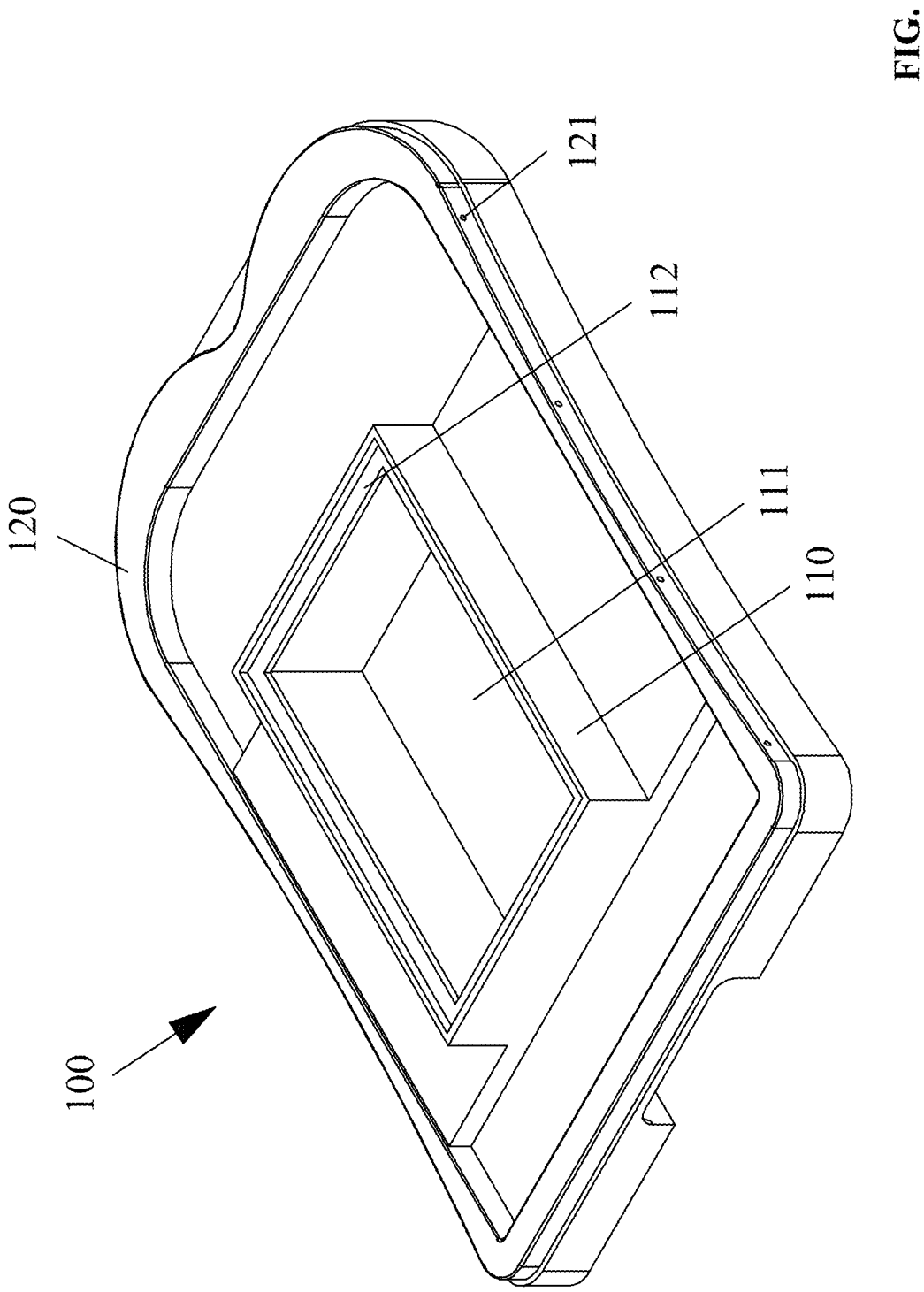
FIG. 6 is a perspective view of a base body according to Examples 1 to 5.
Figure 7:
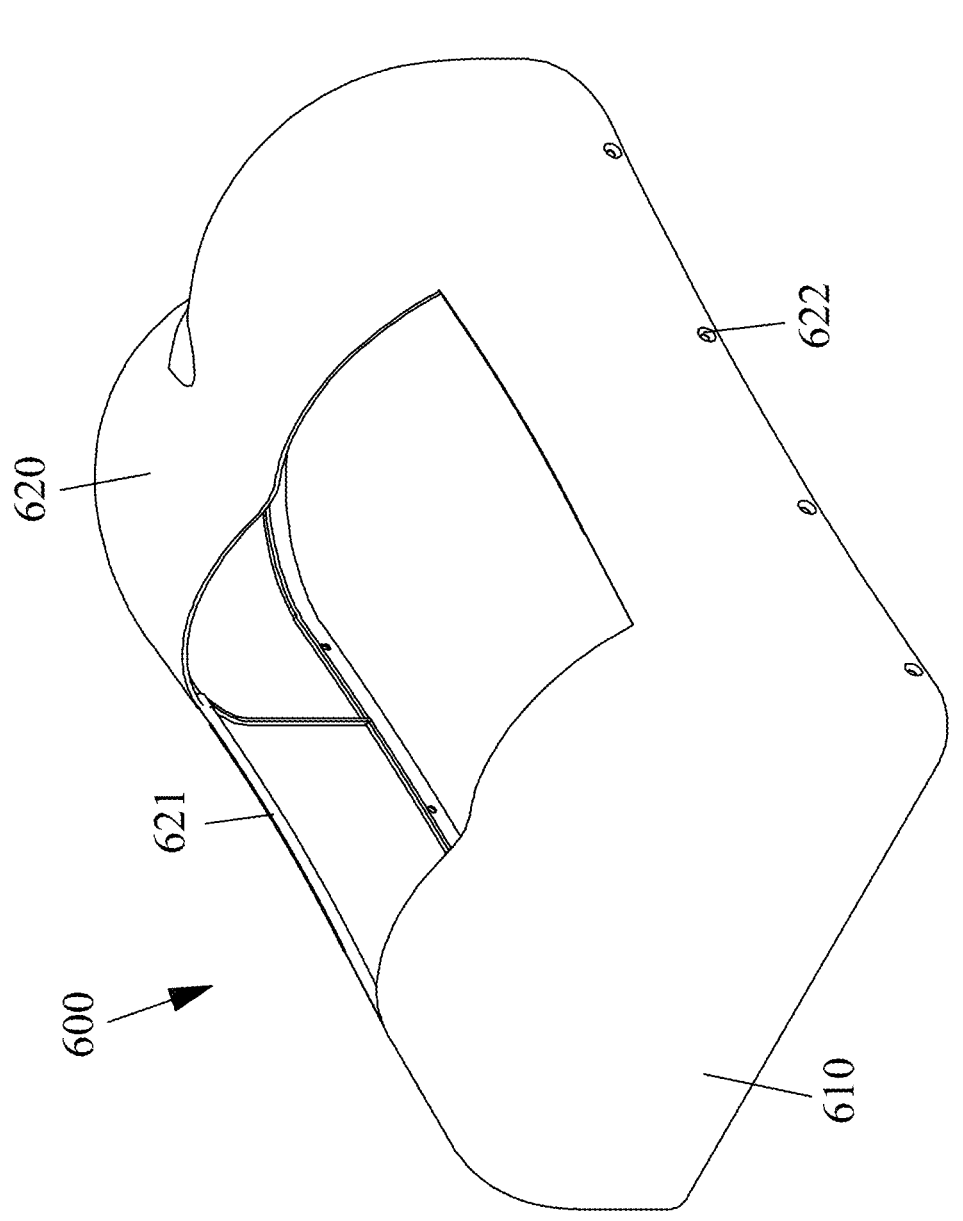
FIG. 7 is a perspective view of an enclosure according to Examples 1 to 5.
Figure 8:
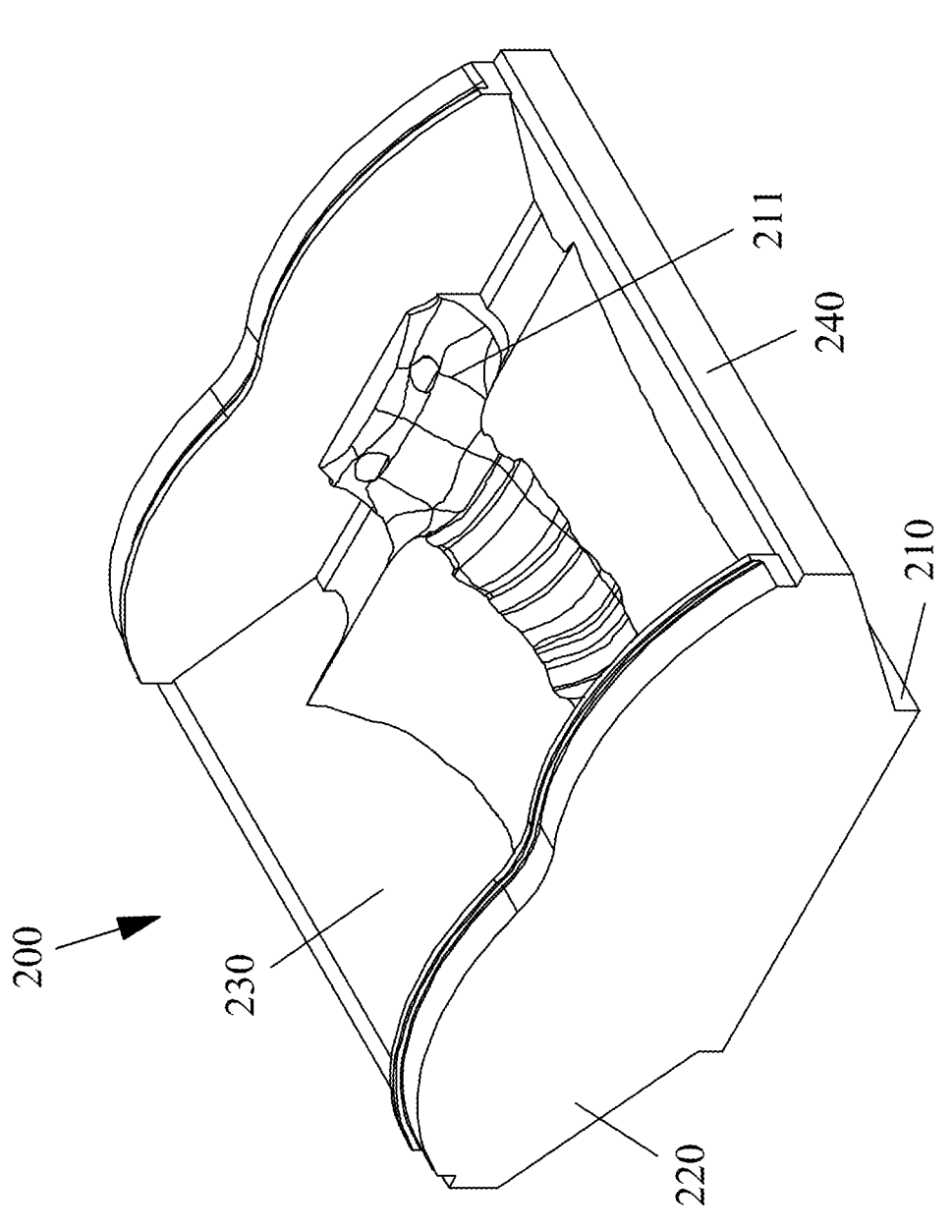
FIG. 8 is a perspective view of a support member according to Examples 1 to 5.
Figure 9:
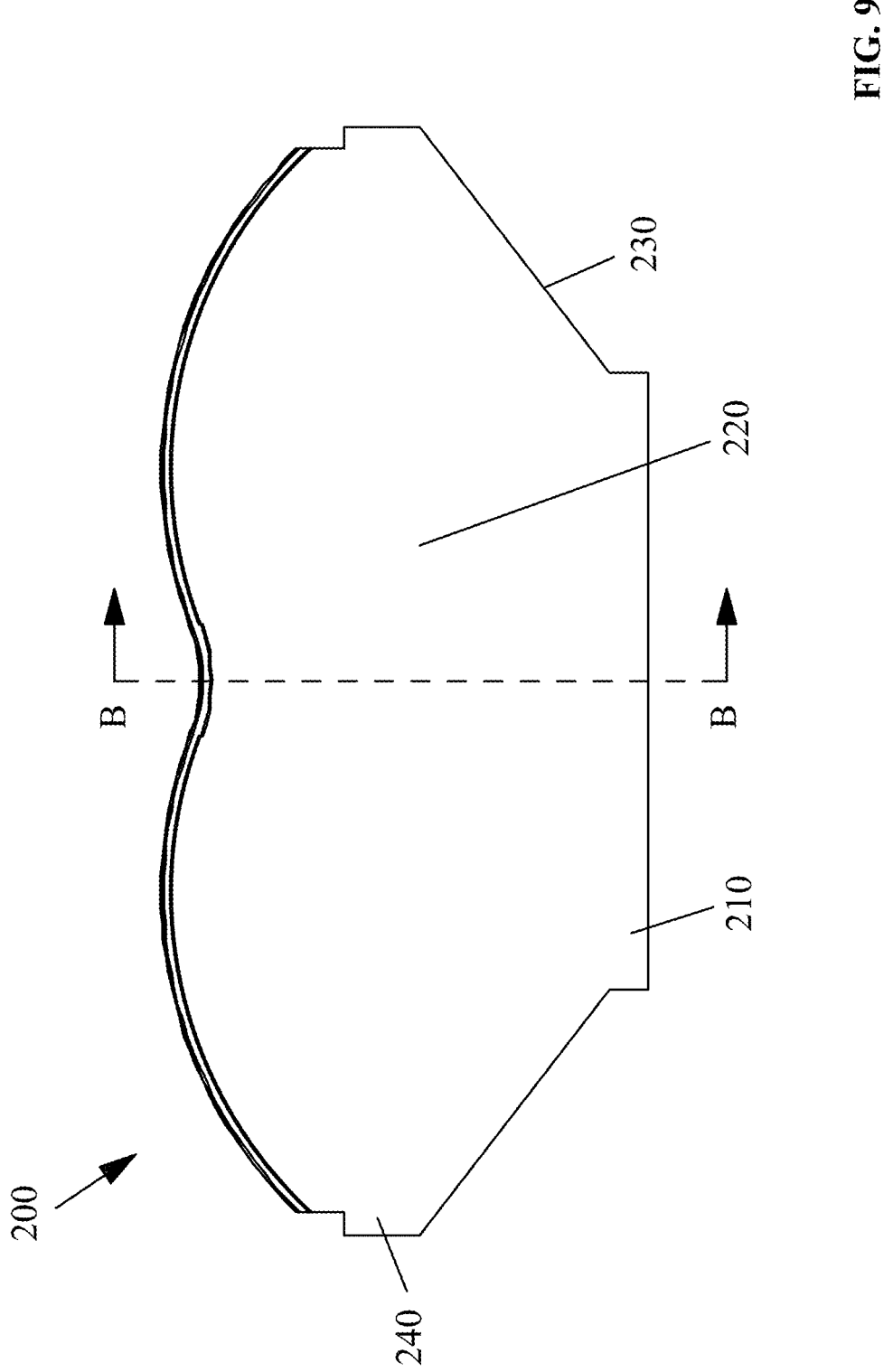
FIG. 9 is an end view of a support member according to Examples 1 to 5.
Figure 10:
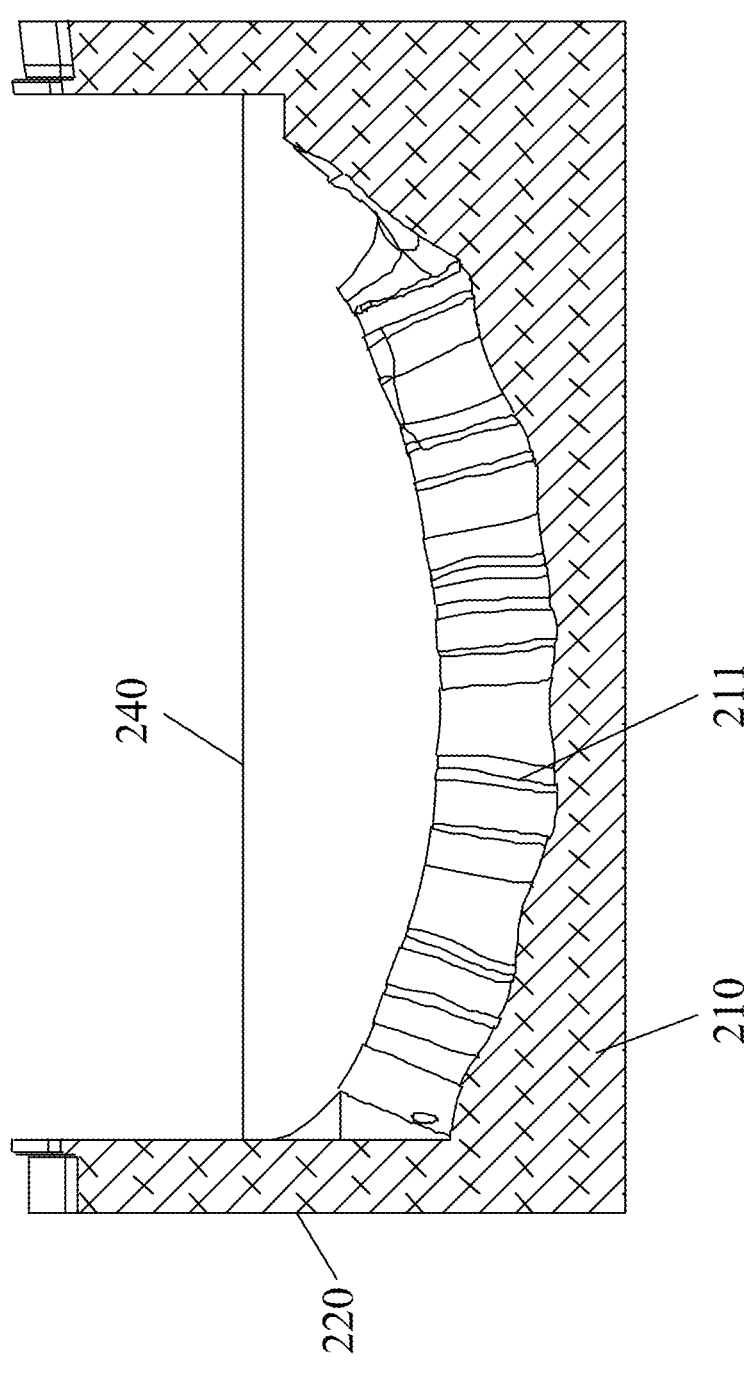
FIG. 10 is a cross-sectional view along line B-B of FIG. 9.

In the drawings, the following reference numbers are used: 1. Inner tube; 2. Outer shell; 3. Tubular body; 4. Metal sensing probe; 5. Metal sensing probe; 6. Sensing coil; 100. Base body; 110. Support base; 111. Contrast cavity; 120. Annular base; 121. Mating groove; 200. Support member; 210. Mounting base; 211. Recessed groove; 220. First plate; 230. Second plate; 240. Third plate; 300. Simulated muscle layer; 400. Simulated fat layer; 500. Outer epidermal layer; 600. Enclosure; 610. Side wall; 620. Top wall; 621. Clamping groove; 700. Bionic spinal body; 710. Vertebral component; and 720. Intervertebral disc.

DETAILED DESCRIPTION

To further illustrate the disclosure, embodiments detailing a bionic spinal model of the disclosure are described below. It should be noted that the following embodiments are intended to describe and not to limit the disclosure.

Example 1

Referring to FIGS. 1 to 10, a bionic spinal model comprises a base body 100, an enclosure 600, a bionic spinal body 700, a simulated muscle layer 300, and a simulated skin layer. The bionic spinal body 700 is disposed on the base body 100. The simulated muscle layer 300 surrounds the bionic spinal body 700. The simulated skin layer overlays the simulated muscle layer 300. The bionic spinal body 700 is radiopaque. The simulated skin layer comprises a simulated fat layer 400 and an outer epidermal layer 500.

The bionic spinal body 700 comprises an internal cavity and a bionic nerve body. The bionic nerve body is disposed in the internal cavity. The bionic nerve body comprises a proximity-sensitive warning mechanism.

The base body 100 comprises a support member 200 in the shape of a trapezoid. The bionic spinal body 700 is disposed within the support member 200. The simulated muscle layer 300 is disposed on the support member 200. The enclosure 600 is disposed on the base body 100 to cover the bionic spinal body 700, the simulated muscle layer 300, and the simulated skin layer. Referring to FIG. 1, the upper surface of the enclosure 600 comprises a port configured to simulate a surgical access. The enclosure 600 further comprises a clamping groove 621 disposed around the port and configured to secure the simulated skin layer. Optionally, a cover is disposed over the port. The base body 100 further comprises a support base and an annular base 120. The annular base 120 is disposed along a peripheral contour of the base body 100. The annular base 120 comprises a mating groove 121. The enclosure 600 comprises a side wall 610 and a top wall 620. The side wall 610 is configured to match with the mating groove 121, and the top wall 620 is shaped to conform to a curvature of a human back. Optionally, the clamping groove 621 is disposed on the top wall 620.

The support member 200 comprises a mounting base 210, two first plates 220, and two second plates 230. The mounting base 210, the two first plates 220, and the two second plates 230 together define a surgical area. The mounting base 210 is embedded within the base body 100. The mounting base 210 is disposed on the support base 110. Each of the two first plates 220 has a fan shape and is disposed at a respective opposite end of the mounting base 210. Each of the two second plates 230 is inclined relative to the mounting base and disposed on an opposite side thereof. The top end of each of the two second plates 230 comprises a third plate 240 disposed perpendicular to the mounting base 210 and configured to support the simulated fat layer 400 and the outer epidermal layer 500. An upper surface of each of the mounting base 210 comprises a recessed groove 211 configured to mate with a lower surface of the bionic spinal body 700, thereby ensuring the bionic spinal body 700 in place.

An upper surface of each third plate defines a skin support surface. Opposite side portions of the simulated skin layer is disposed on a respective skin support surface.

Example 2

Example 2 differs from Example 1 in that the simulated muscle layer 300 is integrally formed by casting. The simulated fat layer 400 and the outer epidermal layer 500, together with the simulated muscle layer 300, form a multi-layer biological tissue structure to simulate an anatomical structure of a human body and to enhance the realism of surgical simulation. In addition, the clamping groove 621 is configured to engage with the outer epidermal layer 500, thereby ensuring that the simulated muscle layer and the simulated skin layer are tightly fitted to simulate the anatomical structure. Furthermore, the support member is formed integrally by foaming a polyurethane material. The foamed polyurethane material exhibits excellent mechanical strength, elasticity, and biocompatibility. The foamed polyurethane material is configured to withstand operational force during simulated surgery while providing a tactile response similar to that of human tissue. The foamed polyurethane material further exhibits radiolucent properties under radiographic imaging, thus enhancing the visibility of the bionic spinal body. In addition, the integral molding of the foamed polyurethane material maintains structural integrity and reduces the risk of loosening or misalignment that may occur in modular designs, thereby improving the accuracy of simulation training.

In certain embodiments, the bionic spinal body is fabricated by a three-dimensional (3D) printing process. The shape and structure of the bionic spinal body is configured, as needed, to correspond to a full-sized bionic lumbar vertebra selected from the group consisting of L1, L2, L3, L4, L5, and S1. In certain embodiments, the lumbar vertebral canal of the bionic spinal body comprises a posterior longitudinal ligament, a bionic nerve bundle, epidural fat, a ligamentum flavum, and an interspinous ligament. In certain embodiments, a supraspinous ligament is further provided on a spinous process of the bionic lumbar vertebra. In certain embodiments, the bionic spinal body 700 comprises a plurality of vertebral components 710 and a plurality of intervertebral discs 720. Each of the plurality of intervertebral discs 720 is provided between every two adjacent vertebral components 710. The plurality of vertebral components 710 and the plurality of intervertebral discs 720 are arranged to follow a curvature of a human spine. Each end of the plurality of vertebral components 710 is adhered to an adjacent intervertebral discs 720 with a medical-grade silicone adhesive. A bottom surface of the recessed groove 211 is contoured conform the curvature of the human spine. The plurality of vertebral components 710 are received in the recessed groove 211 and adhered thereto with the medical-grade silicone adhesive.

Example 3

Example 3 differs from any one of Example 1-2 in that the base body 100 further comprises a contrast cavity 111 configured to enhance imaging contrast. The mounting base 210 is disposed above the contrast cavity 111. The contrast cavity 111 extends partially through the base body 100 and is configured to enhance the imaging contrast of the bionic spinal body 700, thereby simulating preoperative X-ray examination and related procedures. An operator may observe radiographic images of the bionic spinal model to develop a surgical plan based on the imaging data, thereby enabling full-process surgical simulation. In certain embodiments, the support base 110 is disposed at a central portion of the base body 100, and the support member 200 is disposed on the support base 110. The contrast cavity 111 is disposed within the support base 110.

Example 4

Example 4 differs from any one of Examples 1-3 in that the support member 200 defines a surrounding space configured to contain a fluid environment for use in conjunction with a surgical fluid circulation assembly, thereby simulating a surgical irrigation fluid environment around the support member 200. Specifically, a liquid is introduced into the support member 200 to simulate the surgical irrigation fluid environment; the support member 200 further comprises a liquid inlet and an overflow outlet both configured to fluidly connect the interior of the support member 200 with an external water source, thereby enabling continuous liquid flow.

In one embodiment, the surgical fluid circulation assembly comprises a collection tubing connected to the overflow outlet. The support member 200 is in communication with a saline bag. The base body 100 further comprises a collection chamber configured to receive liquid from the collection tubing.

In another embodiment, the surgical fluid circulation assembly comprises an irrigation reservoir, a submersible pump, an inlet tubing, and an outlet tubing. The submersible pump is disposed within the irrigation reservoir. The irrigation reservoir comprises a power supply electrically connected to the submersible pump. One end of the outlet tubing is connected to an output end of the submersible pump, and the other end of the outlet tubing is connected to an irrigation catheter. One end of the inlet tubing is connected to the irrigation reservoir, and the other end of the inlet tubing is connected to the overflow outlet.

In certain embodiments, the surgical fluid circulation assembly is disposed outside the base body 100. The base body 100 further comprises a collection trough, an overflow hole, and a connection socket. The collection trough is configured to receive the liquid from the overflow outlet. The overflow hole is disposed within the collection trough. The connection socket is configured to connect with the overflow hole and connect to the inlet tubing. The base body 100 or the enclosure 600 further comprises a connection hole, a first socket, and a second socket. The first socket and the second socket are respectively disposed on both ends of the connection hole. The first socket is connected to the irrigation catheter, and the second socket is connected to the outlet tubing.

In certain embodiments, the surgical fluid circulation assembly is disposed on the base body 100. The surgical fluid circulation assembly further comprises a stabilizing frame disposed on the base body 100 and configured to engage with the irrigation reservoir. The outlet tubing is connected to the irrigation catheter. The overflow outlet is communicated with the inlet tubing through a plug connector.

Specifically, an irrigation port is disposed on one of the two third plates 240. The irrigation catheter is connected to the irrigation port to introduce the physiological saline, or other fluids, into the surgical area. The overflow outlet is disposed on at least one of the two second plate 230. When the liquid exceeds a predetermined volume, the overflow outlet allows excess fluid to be discharged, thereby simulating fluid management in an actual surgical procedure.

The surgical fluid circulation assembly is configured to cooperate with the base body 100 to control fluid flow and circulation. The submersible pump is configured to draw the liquid from the irrigation reservoir and deliver the liquid through both the outlet tubing and the irrigation catheter to the irrigation port of the surgical area. The submersible pump drives the fluid to flow in a closed-loop circulation within the surgical area, thereby simulating a surgical fluid environments, such as blood or physiological saline. The submersible pump is electrically connected to a power source via a power module for controlled operation. The outlet tubing is connected to the output end of the submersible pump to deliver the fluid to the irrigation port. The inlet tubing is configured to return the fluid from the surgical area to the irrigation reservoir, enabling continuous circulation of the fluid. This arrangement provides sustained fluid supply and recovery, thereby ensuring particulate-controlled hydration of the surgical environment.

Example 5

Example 5 differs from any one of Examples 1-4 in that an upper end of the support base 110 defines a recess 112 disposed above the contrast cavity 111. The recess 112 has a cross-sectional area larger than that of the contrast cavity 111. The support member 200 is received in the recess 112.

A stabilization assembly is disposed in the recess 112 and configured to secure the support member 200.

In one embodiment, the stabilization assembly comprises a carbon fiber plate and a precision alignment seat. The carbon fiber plate is received in the recess 112. During surgical simulation, the carbon fiber plate is adhered to the support member 200 with the medical-grade silicone adhesive. The precision alignment seat is fitted with the support base 110 and configured to engage with the carbon fiber plate. The precision alignment seat comprises a stabilizing groove configured to receive and support the support member 200, and is further secured to the support base 110 with a plurality of fastening screws.

In another embodiment, the stabilization assembly comprises a polypropylene (PP) plate received in the recess 112. During surgical simulation, the PP plate is adhered to the support member 200 with the medical-grade silicone adhesive. The support base 110 is provided with a plurality of limiting screws and a plurality of positioning screws. The plurality of limiting screws are configured to secure the PP plate on the support base 110. The plurality of positioning screws are configured to secure the support member 200 on the support base 110.

The stabilization assembly is configured to maintain positional stability of the support member 200 during simulated surgical procedures, thereby preventing displacement or deformation caused by operational force or angle variations. The support base 110 comprises an opening. The stabilization assembly is disposed in association with the opening and cooperates with the recess 112. The recess 112 has a surface area greater than that of the contrast cavity 111, and is configured to receive the support member 200 in a stable manner.

During an imaging and diagnostic stage, the components of the stabilization assembly, such as the precision alignment seat, the plurality of fastening screws, and the plurality of positioning screws, may be omitted. During a surgical stage, the enclosure 600 is opened, and the precision alignment seat, the plurality of fastening screws, and the plurality of positioning screws, are mounted to the support base 110. The carbon fiber plate and the PP plate provide low attenuation properties during imaging, thereby enhancing the imaging quality of the bionic spinal body.

The side wall 610 comprises a plurality of first slots 622 spaced apart from one other. The mating groove 121 comprises a plurality of second slots. Each of the plurality of first slots corresponds one-to-one with a respective second slot 622. Each of the plurality of second slots 622 is configured to receive a securing pin that engages with the corresponding first slot.

The base body 100 comprises at least two handling slots configured to facilitate transportation. The base body 100 provides stable support for the bionic spinal body. The enclosure 600 constitutes the external appearance of the bionic spinal model and defines a simulated human back environment for spinal surgery training. The clamping groove 621 is configured to secure the outer epidermal layer 500 against the enclosure 600, thereby enhancing realism and protecting internal components. When fitted to the base body 100, the enclosure 600 is shaped to resemble the contour of the human back, providing a surface suitable for surgical training.

Example 6

Figure 11:
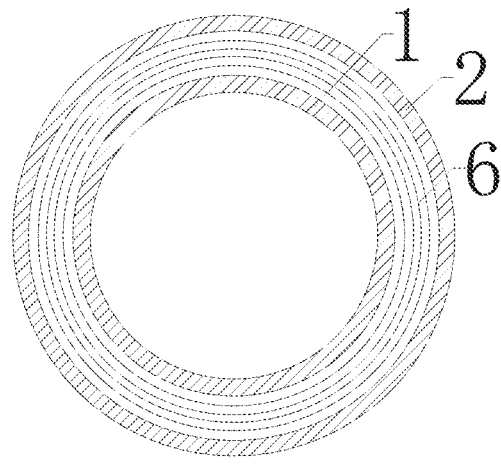
FIG. 11 is a cross-sectional view of each of a plurality of sensing coils in Example 6.
Figure 12:
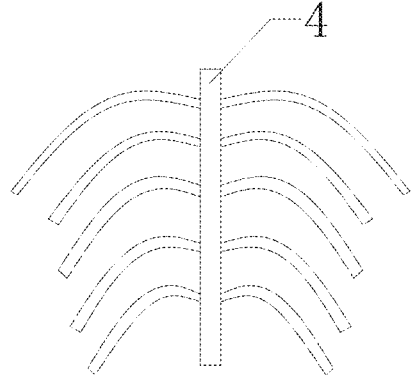
FIG. 12 is another cross-sectional view of a simulated nerve body in Example 6.

Referring to FIGS. 11 and 12, the bionic spinal model further comprises a bionic nerve body. The bionic nerve body further comprises a simulated nerve body, and the proximity-sensitive warning mechanism is disposed on the simulated nerve body.

The proximity-sensitive warning mechanism comprises a plurality of sensing coils 6, a power supply, and an external controller. The plurality of sensing coils 6 are disposed on the simulated nerve body. The power supply is electrically connected to the plurality of sensing coils 6. The external controller is configured to receive a sensing signal from the plurality of sensing coils, process the sensing signal, and trigger a feedback response based on the processed signal.

The simulated nerve body comprises a plurality of inner tubes 1. Each of the plurality of sensing coils 6 is wound around an outer wall of a respective inner tube 1 and disposed within an outer shell 2. The plurality of inner tubes 1 comprise a rigid material, such as hard silicone or hard plastic, or a flexible material such as soft silicone or rubber. The selection of rigid or flexible materials depends on the position and size of the simulated nerve body. For example, a rigid silicone material may be selected for simulating a main spinal nerve to enhance stability, whereas a softer material may be used for branch nerves or smaller nerves to improve similarity to natural nerves. The outer shell comprises a flexible material, such as silicone or rubber.

In certain embodiments, the simulated nerve body is configured as a single-channel pathway. The single-channel pathway comprises a simulated main nerve body, and the proximity-sensitive warning mechanism is provided thereon. Each of the plurality of inner tubes 1 has an inner diameter of 10 mm and a wall thickness ranging from 0.5 mm to 1 mm. The outer shell 2 has a thickness of 1.5 mm. The plurality of sensing coils 6 are each continuously wound around the outer wall of a respective inner tube 1. Each of the plurality of sensing coils 6 comprises a copper enameled wire having a diameter of 0.1 mm. Both ends of each of the plurality of sensing coils 6 extend along the outer wall of a respective inner tube 1 and are electrically connected to the power supply and the external controller. For surgical training applications, a preset feedback distance of 0.5 cm is sufficient to meet the feedback accuracy requirements. To satisfy the feedback distance precision, the number of coil turns wound around the simulated main nerve body can be set to 1500 turns per centimeter, with a power supply voltage of approximately 3.5 volts.

In certain embodiments, the simulated nerve body is configured as a multi-channel interconnected pathway. The multi-channel interconnected pathway comprises a simulated main nerve body and a plurality of simulated branch nerve bodies interconnected with the simulated main nerve body. The proximity-sensitive warning mechanism is disposed on the multi-channel interconnected pathway. The simulated main nerve body comprises a plurality of inner tubes 1, each having an inner diameter of 10 mm. Each inner tube 1 is disposed within an outer shell 2 having a thickness of 1.5 mm. Each of the plurality of simulated branch nerve bodies comprises a plurality of inner tubes 1, each having an inner diameter of 5 mm, and each inner tube 1 is disposed within an outer shell 2 having a thickness of 2 mm. Each of the plurality of sensing coils 6 is wound around the outer wall of a respective inner tube 1. Each of the plurality of sensing coils 6 comprises a copper enameled wire having a diameter of 0.1 mm and is wound independently on the inner tube between adjacent pathway nodes and between a pathway node and a pathway end. Each independently wound sensing coil 6 comprises two ends extending externally along the outer wall of a respective inner tube and is electrically connected to the power supply and the external controller. A minimum spacing of 0.5 cm is maintained between the closest ends of every two adjacent sensing coils to reduce interference between neighboring coils. For surgical training, a preset feedback distance of 0.5 cm satisfies the feedback accuracy requirements. Under the condition, the coil turn count for the simulated main nerve body is set to 1500 turns per centimeter with a power supply voltage of 3.5 volts, while the coil turn count for the simulated branch nerve body is set to 2000 turns per centimeter. The external controller may be a microcontroller or microprocessor consistent with known technology.

The bionic nerve body further comprises an internal cavity, and the simulated nerve body is disposed in the internal cavity.

Example 7

Figure 13:
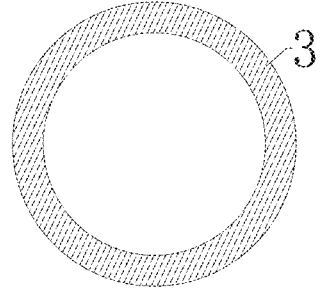
FIG. 13 is a cross-sectional view of each of a plurality of metal sensing probes in Example 7.
Figure 14:
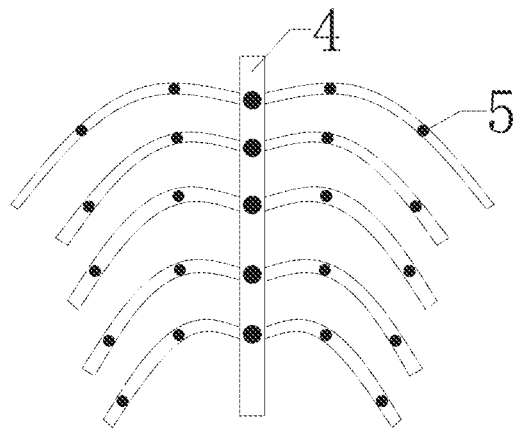
FIG. 14 is a cross-sectional view of a simulated nerve body and an arrangement of a plurality of metal sensing probes in Example 7.
Figure 15:
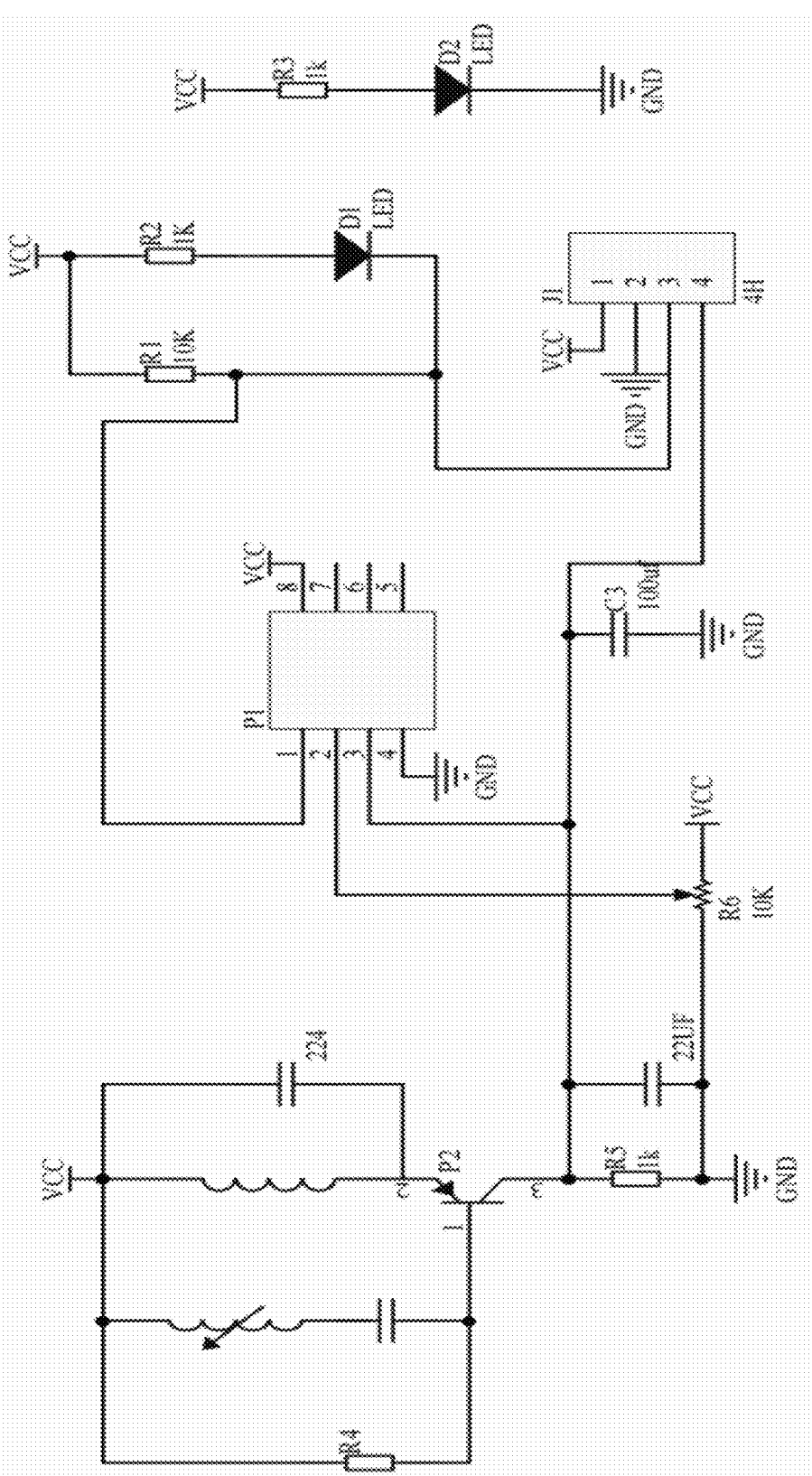
FIG. 15 is a circuit diagram of a metal sensing circuit in Example 7.

Referring to FIGS. 13, 14, and 15, the bionic spinal model further comprises a bionic nerve body. The bionic nerve body comprises a simulated nerve body 4 and the proximity-sensitive warning mechanism is disposed on the simulated nerve body.

The proximity-sensitive warning mechanism comprises a plurality of sensing coils 6, a power supply, and an external controller. The plurality of sensing coils 6 are disposed on the simulated nerve body. The power supply is electrically connected to the sensing coil 6. The external controller is configured to receive a sensing signal from the plurality of sensing coils, process the sensing signal, and trigger a feedback response based on the processed signal.

The simulated nerve body comprises a plurality of tubular bodies 3. The proximity-sensitive warning mechanism further comprises a metal detector 5. The metal detector comprises a plurality of metal sensing probes 5, a DC power supply, a plurality of connection wires, a surgical metal instrument, and an integrated circuit board. Each of the plurality of sensing coils is disposed within a respective metal sensing probe. The plurality of metal sensing probes 5 are uniformly arranged on the inner wall of a respective tubular body. Each tubular body 3 has an outer diameter of 10 mm. The plurality of tubular bodies 3 comprise flexible materials such as silicone or rubber, or alternatively from rigid materials.

The plurality of metal sensing probes 5 are each bonded to the inner wall of the respective tubular body 3 or fixed to the inner wall via a support bracket. The support bracket can be implemented using the stabilizing frame as described in Example 4. Each of the plurality of metal sensing probes 5 extends from the interior of the respective tubular body 3 and is electrically connected to the external controller.

The integrated circuit board comprises a voltage comparator, an oscillator circuit, a potentiometer, and an LED warning light. The voltage comparator may be an LM393 chip, and the DC power supply (Vcc) may be a 5-volt battery. The oscillator circuit comprises a resistor R4, a first inductor coil, a second inductor coil, a first capacitor, a second capacitor, a transistor, and resistor R5. The first inductor coil is connected in series with the first capacitor. One end of the series connection is connected to Vcc, and the other end of the series connection is connected to a base of the transistor. One end of the resistor R4 is connected to Vcc, and the other end the resistor R4 is connected to the base of the transistor. The second inductor coil and second capacitor are connected in parallel. One end of the parallel connection is connected to Vcc, and the other end of the parallel connection is connected to the emitter of the transistor. The collector of the transistor is electrically connected to one end of the resistor R5, the other end of which is connected to ground. One terminal of the potentiometer is connected to ground, and another terminal of the potentiometer is connected to Vcc. A wiper terminal of the potentiometer is connected to the inverting input of the voltage comparator. The non-inverting input of the voltage comparator is connected to the non-grounded terminal of the resistor R5. The output terminal of the voltage comparator is connected in series with resistor R1 to Vcc. The resistor R2 and the LED warning light are connected in series between Vcc and the output terminal of the voltage comparator.

Each of the plurality of sensing coils 6 is disposed within a respective metal sensing probe and comprises two leads electrically connected to the integrated circuit board.

In certain embodiments, the simulated nerve body is configured as a single-channel pathway, comprising a simulated main nerve body. A single metal sensing probe is disposed within a respective tubular body at each intervertebral junction.

In certain embodiments, the simulated nerve body is configured as a multi-channel interconnected pathway, comprising a simulated main nerve body and a plurality of simulated branch nerve bodies interconnected with the simulated main nerve body. A single metal sensing probe is disposed between adjacent pathway nodes and between a pathway node and a pathway end. Each simulated branch nerve body is provided with two metal sensing probes symmetrically arranged thereon.

During surgical training, when a surgical metal instrument approaches or contacts the simulated nerve body, the sensing coil 6 within the oscillator circuit generate a high-frequency magnetic field. As the surgical metal instrument approaches the magnetic field, eddy currents induced by electromagnetic induction within the surgical metal instrument increase in magnitude, thereby affecting the current in the oscillation circuit. Consequently, the voltage at resistor R5 changes, causing the voltage comparator to compare voltages at its inverting and non-inverting inputs. This causes the comparator output to go low, turning on the LED warning light.

The bionic nerve body further comprises an internal cavity, and the simulated nerve body is disposed in the internal cavity.

Example 8

A bionic lumbar vertebra model comprises a cancellous bone core and a cortical bone layer coated onto the cancellous bone core. A method for preparing a bionic lumbar vertebra model for X-ray imaging, the method comprises:

S1. Preparation of the cancellous bone core:

(a1) Premixing: 100 parts by weight of polyether polyol, 1 part of polydimethylsiloxane (PDMS), 30 parts of 1,4-butanediol, 0.2 part of triethylene diamine (A33, as a catalyst), 1 part of triethanolamine, 10 parts of trimethylolpropane, and 0.8 part of deionized water were added into a mixing tank and stirred at a speed of 1000 rpm until a uniform mixture was obtained, defined as material A.

(a2) Addition of material B: While stirring the material A, 170 parts of polymeric methylene diphenyl diisocyanate (defined as material B) were slowly added. The stirring speed was then adjusted to 500 rpm, and stirring was continued for 15 seconds to obtain a homogeneous mixture.

(a3) Foaming and molding: The homogeneous mixture was immediately poured into a lumbar vertebra mold and sealed to allow the reaction to proceed. The internal temperature of the lumbar vertebra mold was maintained at 25° C., and the mixture was cured for 24 hours.

S2. Preparation of a SAN resin-modified SA emulsion for use as a material of the cortical bone layer:

(b1) Pre-emulsification: In reactor A, 20 parts by weight of styrene, an acrylate monomer component (comprising 10 parts of butyl acrylate and 20 parts of methyl methacrylate), 1.0 part of sodium dodecylbenzenesulfonate, 0.3 part of ammonium persulfate, and 30 parts of deionized water were mixed to form a mixture. The mixture was stirred at 500 rpm and heated to 40° C. After the temperature stabilized, the stirring speed was adjusted to 2000 rpm and continued for 20 minutes to form a pre-emulsion.

(b2) Synthesis of SA emulsion: In reactor B, 20 parts by weight of deionized water, 0.5 part of ammonium persulfate (as an initiator), 0.5 part of sodium dodecyl-benzenesulfonate (as an emulsifier), and 15 parts of potassium iodide (as a contrast agent) were added. The mixture was stirred at 400 rpm and heated to 80° C. under a nitrogen atmosphere. The pre-emulsion prepared in b1) was then added dropwise, and emulsion polymerization was conducted for 1 hour. Upon completion of the emulsion polymerization, the reaction mixture was cooled to room temperature to yield a SA emulsion.

(b3) Synthesis of styrene-acrylonitrile (SAN) resin emulsion: 0.5 part by weight of potassium persulfate (KSP) was dissolved in 50 parts of deionized water to prepare a 1 wt. % aqueous KSP solution. In reactor C, 50 parts of deionized water and 1.0 part of sodium dodecylbenzenesulfonate were heated to 65° C. while stirring at 400 rpm. Under a nitrogen atmosphere, the KSP solution and a monomer mixture comprising 30 parts styrene and 20 parts acrylonitrile were simultaneously added dropwise over 1 hour. The reaction was then continued for an additional hour, followed by cooling to room temperature to obtain a styrene-acrylonitrile (SAN) resin emulsion.

(b4) Modification with SAN resin emulsion: The SAN resin emulsion prepared in b2) was stirred in reactor B at a constant temperature of 40° C. 30 parts by weight of the SAN resin prepared in b3) were slowly added with continuous stirring until a uniform mixture was obtained. The resulting mixture was cooled to room temperature, and 0.5 part of pigment was added and stirred thoroughly to yield a SAN resin-modified SA emulsion suitable for X-ray imaging.

S3. Coating of the SAN resin-modified SA emulsion onto the cancellous bone core:

The SAN resin-modified SA emulsion prepared in S2 was applied to the surface of the cancellous bone core prepared in S1 by spraying or dipping. In the spraying process, a thin-spray technique was employed. Each sprayed coating had a thickness of 0.3 mm, and each coating was dried before applying the next layer. Spraying was repeated 5 times to form the cortical bone layer.

Example 9

Prepared in the same manner as described in Example 8, except that 5 parts by weight of the SAN resin emulsion were added.

Example 10

Prepared in the same manner as described in Example 8, except that 10 parts of styrene were used in b1).

Example 11

Prepared in the same manner as described in Example 8, except that the emulsifier was fatty alcohol polyoxyethylene ether.

Example 12

Prepared in the same manner as described in Example 8, except that the emulsifier was alkyl phenol polyoxyethylene ether.

Example 13

Prepared in the same manner as described in Example 8, except that the acrylate monomer component comprised 10 parts by weight of ethyl acrylate, 10 parts of butyl acrylate, and 10 parts of methyl methacrylate.

Example 14

Prepared in the same manner as described in Example 8, except that the contrast agent comprised 10 parts by weight of potassium iodide (KI) and 5 parts of sodium iodide (NaI).

Example 15

Prepared in the same manner as described in Example 8, except that the contrast agent comprised 10 parts of potassium iodide (KI), 3 parts of sodium iodide (NaI), and 2 parts of calcium iodide ($CaI_2$).

Example 16

A bionic lumbar vertebra model comprises a cancellous bone core and a cortical bone layer coated onto the cancellous bone core. A method for preparing a bionic lumbar vertebra model for X-ray imaging, the method comprises:

S1. Preparation of the cancellous bone core:

(a1) Premixing: 10 parts y weight of polyether polyol, 0.5 part of polydimethylsiloxane (PDMS), 10 parts of 1,4-butanediol, 0.1 part of catalyst A33, 0.5 part of triethanolamine, 0.1 part of trimethylolpropane, and 0.1 part of deionized water were added into a mixing tank and stirred at a speed of 1000 rpm until a uniform mixture was obtained, defined as material A.

(a2) Addition of material B: While stirring the material A, 10 parts of polymeric methylene diphenyl diisocyanate (defined as material B) were slowly added. The stirring speed was then adjusted to 300 rpm, and stirring was continued for 15 seconds to obtain a homogeneous mixture.

(a3) Foaming and molding: The mixed liquid material was immediately poured into a lumbar vertebra mold and sealed to allow the reaction to proceed. The internal temperature of the lumbar vertebra mold was maintained at 25° C., and the mixture was cured for 24 hours.

S2. Preparation of a SAN resin-modified styrene-acrylic emulsion for use as a material of the cortical bone layer:

(b1) Pre-emulsification: In reactor A, 10 parts by weight of styrene, 10 parts of ethyl acrylate, 19 parts of butyl acrylate, 0.5 part of fatty alcohol polyoxyethylene ether (as an emulsifier), 0.1 part of 1-dodecanethiol (as a chain transfer agent), and 10 parts of deionized water were stirred at 1000 rpm for 10 minutes to obtain a pre-emulsion.

(b2) Synthesis of styrene-acrylic (SA) emulsion: In reactor B, 10 parts by weight of deionized water, 0.5 part of ammonium persulfate (as an initiator), 0.5 part of emulsifier, and 1 part of sodium iodide (NaI, as a contrast agent) were added. The mixture was stirred and heated to 80° C. under a nitrogen atmosphere. The pre-emulsion prepared in b1) was then added dropwise, and emulsion polymerization was conducted for 1 hour. Upon completion of the reaction, the reaction mixture was cooled to room temperature to yield a SA emulsion.

(b3) Synthesis of styrene-acrylonitrile (SAN) resin emulsion: In reactor C, 30 parts by weight of styrene, 20 parts of acrylonitrile, 0.5 part of fatty alcohol polyoxyethylene ether, 0.5 part of potassium persulfate (KSP), and 50 parts of deionized water were subjected to emulsion polymerization at a stirring speed of 1000 rpm for 10 minutes to form a styrene-acrylonitrile (SAN) resin emulsion.

(b4) Modification with SAN resin emulsion: The SA emulsion prepared in b2) was stirred at constant temperature in reactor B. 5 parts by weight of the SAN resin prepared in b3) were slowly added with continuous stirring until a uniform mixture was obtained. The resulting mixture was cooled to room temperature, and 0.1 part of pigment was added and stirred thoroughly to yield a SAN resin-modified SA emulsion suitable for X-ray imaging.

S3. Coating of the SAN resin-modified SA emulsion onto the cancellous bone core:

The SAN resin-modified SA emulsion was poured into a container. The cancellous bone core was literally dipped into the SAN resin-modified SA emulsion for 30 seconds. The cancellous bone core was then slowly withdrawn from the liquid surface and allowed to dry. The dipping and drying procedure was repeated twice to form a cortical bone layer suitable for X-ray imaging.

Example 17

A bionic lumbar vertebra model comprises a cancellous bone core and a cortical bone layer coated onto the cancellous bone core. A method for preparing a bionic lumbar vertebra model for X-ray imaging, the method comprises:

S1. Preparation of the cancellous bone core:

(a1) Premixing: 20 parts by weight of polyether polyol, 1.5 parts of polydimethylsiloxane (PDMS), 40 parts of 1,4-butanediol, 0.5 part of catalyst A33, 1.5 parts of triethanolamine, 10 parts of trimethylolpropane, and 3.0 parts of deionized water were added into a mixing tank and stirred at a speed of 2000 rpm for 20 minutes until a uniform mixture was obtained, defined as material A;

(a2) Addition of material B: While stirring the material A, 170 parts by weight of polymeric methylene diphenyl diisocyanate (defined as material B) were slowly added. The stirring speed was then adjusted to 500 rpm, and stirring was continued for 15 seconds to obtain a homogeneous mixture;

(a3) Foaming and molding: The homogeneous mixture was immediately poured into a lumbar vertebra mold and sealed to allow the reaction to proceed. The internal temperature of the lumbar vertebra mold was maintained at 55° C., and the mixture was cured for 30 minutes.

S2. Preparation of a SAN resin-modified SA emulsion for use as a material of the cortical bone layer:

(b1) Pre-emulsification: In reactor A, 20 parts of styrene, 10 parts by weight of ethyl acrylate, 20 parts of butyl acrylate, 1.5 parts of polyoxyethylene alkylphenol ether (as an emulsifier), 3.0 parts of 1-dodecanethiol (as a chain transfer agent), and 40 parts of deionized water were stirred at 2000 rpm for 20 minutes to form a pre-emulsion.

(b2) Synthesis of styrene-acrylic (SA) emulsion: In reactor B, 60 parts by weight of deionized water, 3 parts of ammonium persulfate (as an initiator), 1.0 part of polyoxyethylene alkylphenol ether (as an emulsifier), and 30 parts of calcium iodide ($CaI_2$, as a contrast agent) were added. The mixture was stirred and heated to 80° C. under a nitrogen atmosphere. The pre-emulsion prepared in b1) was then added dropwise, and emulsion polymerization was conducted for 2 hours. Upon completion of the reaction, the reaction mixture was cooled to room temperature to yield the SA emulsion.

(b3) Synthesis of styrene-acrylonitrile (SAN) resin emulsion: In reactor C, 30 parts by weight of styrene (ST), 20 parts of acrylonitrile (AN), 1.0 part of fatty alcohol polyoxyethylene ether, 0.5 part of potassium persulfate (KSP), and 100 parts of deionized water were subjected to emulsion polymerization at a stirring speed of 2000 rpm for 20 minutes to form a styrene-acrylonitrile (SAN) resin emulsion.

(b4) Modification with SAN resin emulsion: The SA emulsion prepared in b2) was stirred at constant temperature in reactor B. 40 parts by weight of the SAN resin prepared in step (b3) were slowly added with continuous stirring until a uniform mixture was obtained. The resulting mixture was cooled to room temperature, and 1.0 part of pigment was added and stirred thoroughly to yield a SAN resin-modified SA emulsion suitable for X-ray imaging.

S3. Coating of the SAN resin-modified SA emulsion onto the cancellous bone core:

The SAN resin-modified SA emulsion was poured into a container. The cancellous bone core was literally dipped into the SAN resin-modified SA emulsion for 30 seconds. The cancellous bone core was then slowly withdrawn from the liquid surface and allowed to dry. The dipping and drying procedure was repeated twice to form a cortical bone layer suitable for X-ray imaging.

Comparative Example 1

Prepared in the same manner as described in Example 8, except that 5 parts by weight of barium sulfate ($BaSO_4$), serving as a conventional contrast agent, were used.

Comparative Example 2

Prepared in the same manner as described in Example 8, except that no SAN resin emulsion was added for modification. Specifically, the preparation steps were as follows:

(a) Pre-emulsification: In reactor A, 20 parts by weight of styrene, 10 parts of butyl acrylate, 20 parts of methyl methacrylate, 1.0 part of sodium dodecylbenzene sulfonate, 0.3 part of ammonium persulfate, and 30 parts of deionized water were mixed. The mixture was stirred at 500 rpm and heated to 40° C. After the temperature was stabilized, the stirring speed was increased to 2000 rpm and maintained for 20 minutes to obtain a pre-emulsion.

(b) Emulsion polymerization: In reactor B, 20 parts by weight of deionized water, 0.5 part of ammonium persulfate (as an initiator), 0.5 part of sodium dodecylbenzenesulfonate (as an emulsifier), and 15 parts of potassium iodide as a contrast agent were added. The mixture was stirred at 400 rpm and heated to 80° C. Under a nitrogen atmosphere, the pre-emulsion prepared in a) was added dropwise, and the mixture was subjected to emulsion polymerization for 1 hour. Upon completion of the reaction, the stirring speed was reduced to 300 rpm, and the temperature was lowered to 40° C. Subsequently, 0.5 part of titanium dioxide (rutile) pigment was added, the stirring speed was increased to 500 rpm, and stirring was continued for 10 minutes to obtain a white poly(styrene-acrylate) emulsion suitable for X-ray imaging.

(c) Spraying: A thin-spray coating technique was employed, with each coating having a thickness of 0.3 mm. Each coating was dried before applying the next layer. Spraying was repeated 5 times to form the cortical bone layer.

Comparative Example 3

Prepared in the same manner as described in Example 8, except that the contrast agent was added using a different procedure. Specifically, the preparation steps were as follows:

(a) Pre-emulsification: In reactor A, 20 parts by weight of styrene, 10 parts of butyl acrylate, 20 parts of methyl methacrylate, 1.0 part of sodium dodecylbenzene sulfonate, 0.3 part of ammonium persulfate, and 30 parts of deionized water were mixed. The mixture was stirred at 500 rpm while being heated to 40° C. After the temperature was stabilized, the stirring speed was increased to 2000 rpm and maintained for 20 minutes to obtain a pre-emulsion.

(b) Emulsion polymerization: In reactor B, 20 parts by weight of deionized water, 0.5 part of ammonium persulfate (as an initiator), and 0.5 part of sodium dodecylbenzene sulfonate (as an emulsifier) were added. The mixture was stirred at 400 rpm and heated to 80° C. Under a nitrogen atmosphere, the pre-emulsion prepared in a) was added dropwise, and emulsion polymerization was conducted for 1 hour. Upon completion of the reaction, the stirring speed was reduced to 300 rpm, and the mixture was cooled to room temperature to obtain a styrene-acrylic (SA) emulsion.

(c) Synthesis of SAN resin emulsion: 0.5 part by weight of potassium persulfate (KPS) was dissolved in 50 parts of deionized water to prepare a 1 wt. % aqueous KPS solution. In reactor C, 50 parts of deionized water and 1.0 part of sodium dodecylbenzene sulfonate were added, stirred at 400 rpm, and heated to 65° C. Under a nitrogen atmosphere, the KPS solution and a pre-mixed monomer mixture comprising 30 parts of styrene and 20 parts of acrylonitrile were added dropwise at a constant rate over 1 hour. The reaction was continued for an additional 1 hour, followed by cooling to room temperature with stirring to obtain a SAN resin emulsion.

(d) Modification with SAN resin emulsion: The SA emulsion prepared in b) was heated to 40° C. in reactor B while stirring at 300 rpm. Over 15 minutes, 30 parts by weight of the SAN resin emulsion prepared in c) were slowly added to reactor B. The mixture was stirred continuously for 30 minutes. Subsequently, 15 parts of contrast agent KI and 0.5 part of titanium dioxide (rutile) pigment were added. The stirring speed was adjusted to 500 rpm, and stirring continued for 10 minutes to obtain a SAN resin-modified poly(styrene-acrylate) emulsion suitable for X-ray imaging.

(e) Spraying: A thin-spray coating technique was employed, with each coating having a thickness of 0.3 mm. Each coating layer was dried before applying the next layer. Spraying was repeated 5 times to form the cortical bone layer.

Performance Evaluation

1. Coating Hardness Test

The hardness of the coating was measured in accordance with the pencil hardness test standard GB/T 6739-2022. Tinplate panels measuring 120 mm×50 mm×0.3 mm were first sanded, cleaned, and dried. The SAN resin-modified SA emulsion was then uniformly applied to the panel surfaces using a paint brush. After drying at room temperature for 7 days, the hardness was tested using a pencil scratch tester. Three scratch tests were performed with pencils of the same hardness, and the coating hardness was recorded as the highest pencil grade that did not produce visible scratches on the coating, as shown in Table 1.

TABLE 1

| Hardness Test Results | |
| --- | --- |
| Sample | Pencil Hardness |
| Example 8 | 7H |
| Example 9 | 4H |
| Example 10 | 6H |
| Example 13 | 5H |
| Comparative Example 2 | 2H |

2. X-Ray Imaging Test

The bionic lumbar vertebra model prepared was imaged using a Cios Select mobile C-arm X-ray system (Siemens Medical Instruments Co., Ltd., Shanghai) under the conditions of 60 kV voltage, 10 mA current, and 0.2 s exposure time to evaluate the radiographic contrast.

Analysis of Coating Hardness:

Example 8 exhibited the highest hardness, suggesting that the SAN resin emulsion at an optimal composition can significantly enhance coating hardness, which is critical for forming the cortical bone layer in a bionic lumbar vertebra model.

Comparison of Examples 9 and 8 indicates that the amount of the SAN resin emulsion has a direct effect on hardness, since styrene and acrylonitrile are hard monomers. Accordingly, the hardness of the cortical bone layer can be adjusted by varying the amount of SAN resin emulsion, thereby achieving a modulus comparable to that of real bones at different age stages.

Data from Examples 10 and 13 further confirm the influence of monomer composition on hardness, supporting a strategy of optimizing hardness by adjusting the monomer ratio.

Compared with Comparative Example 2, Examples 8, 9, 10, and 13 all exhibit higher hardness, highlighting the application of the SAN resin-modified SA emulsion in enhancing both coating hardness and overall performance.

Figure 16:
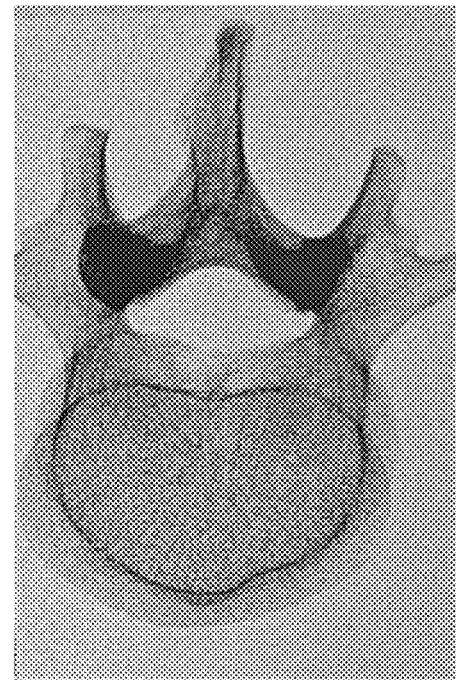
FIG. 16 shows the X-ray image of a real lumbar vertebra.
Figure 17:
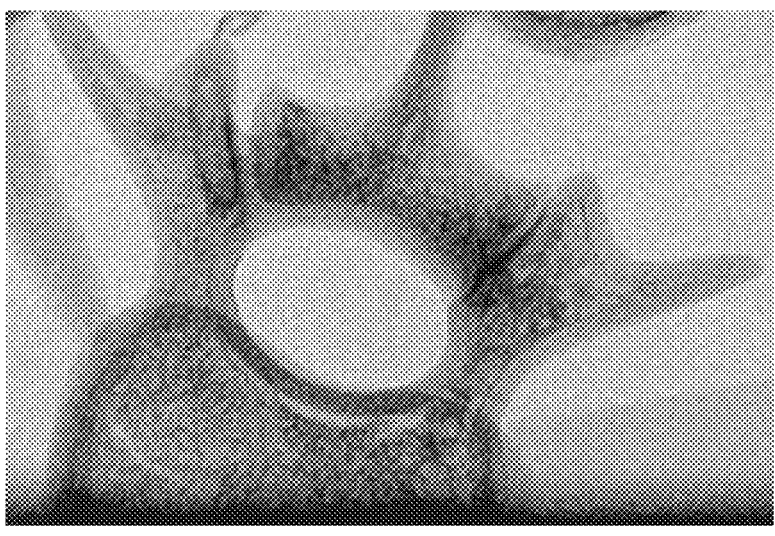
FIG. 17 shows the X-ray image of Example 8.
Figure 18:
FIG. 18 shows the X-ray image of Example 14.
Figure 19:
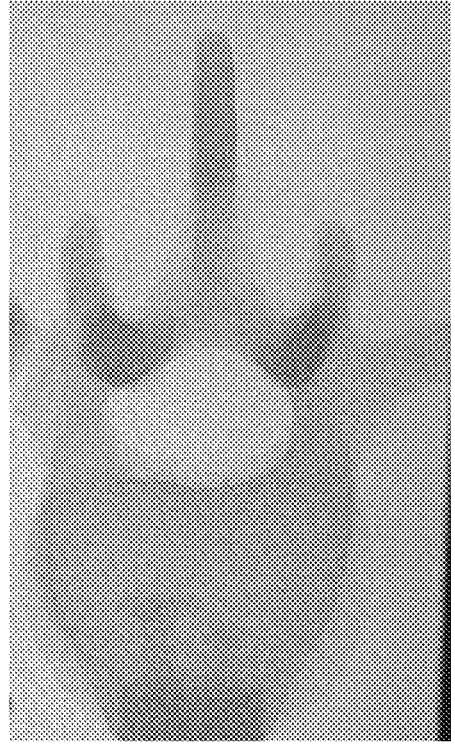
FIG. 19 shows the X-ray image of Example 15.
Figure 20:
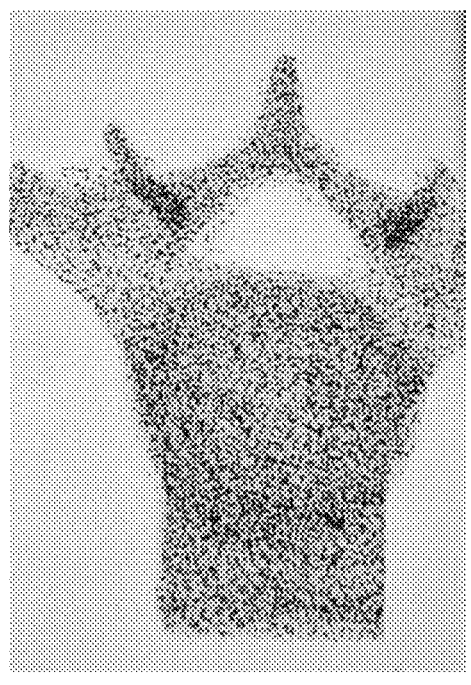
FIG. 20 shows the X-ray image of Comparative Example 1.
Figure 21:
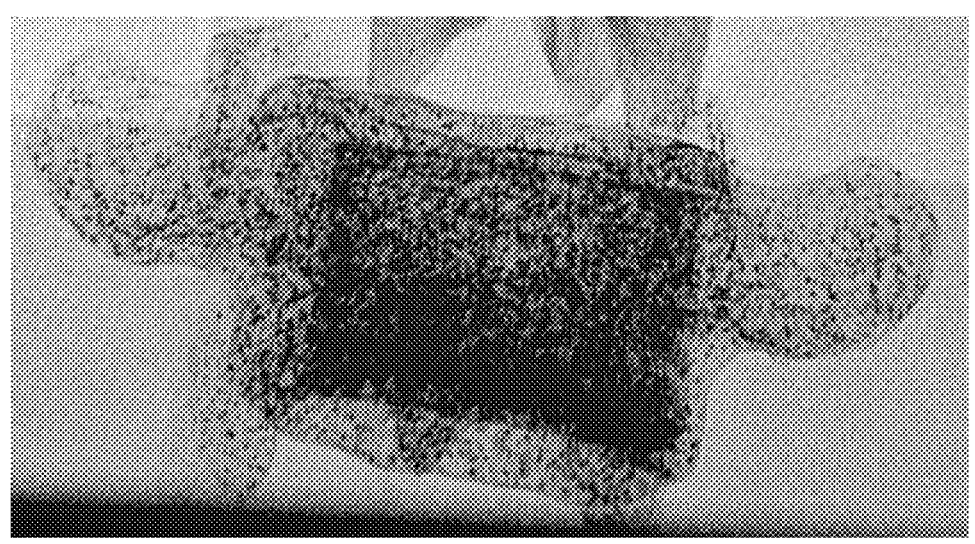
FIG. 21 shows the X-ray image of Comparative Example 3.

As shown in FIGS. 16-21, compared with the X-ray image of a real lumbar vertebra in FIG. 16, the X-ray imaging effect of Comparative Example 1, in which the conventional contrast agent $BaSO_4$ was added, is poor (FIG. 20). This is because $BaSO_4$ is insoluble in the aqueous emulsion and remains dispersed as solid particles, making the imaging effect dependent on particle size. In addition, $BaSO_4$ has a density of $4.50\ g\ cm^{-3}$ and readily sediments in the emulsion, causing phase separation and reducing imaging quality.

Figure 22:
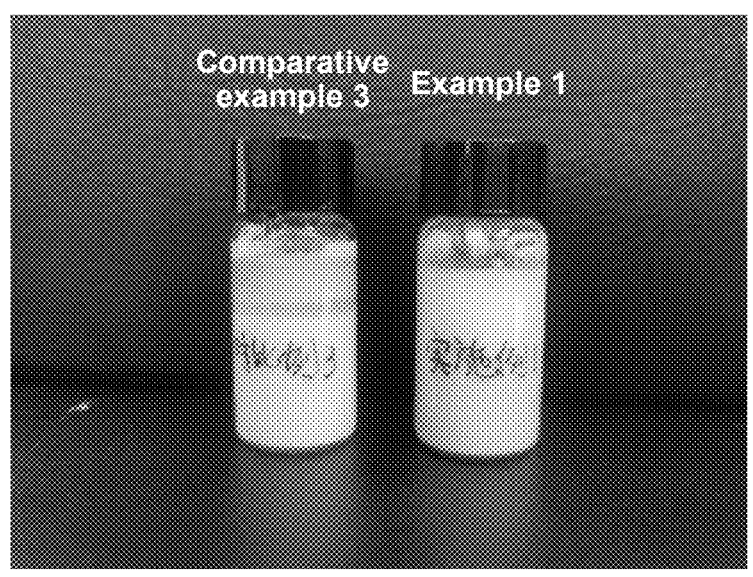
FIG. 22 is a comparison of emulsion appearance between Example 1 and Comparative Example 3.

In Comparative Example 3 (FIG. 21), the contrast agent was added in step (d), after the emulsion system had stabilized. The addition of salts such as potassium iodide or sodium iodide can destabilize the emulsion, as shown in FIG. 22. During spraying, emulsion breakage leads to uneven film formation, and gravity causes the contrast agent to settle at the bottom of the cancellous bone core, resulting in non-uniform X-ray imaging.

As shown in FIG. 22, the SAN resin-modified poly (styrene-acrylate) emulsion described in Comparative Example 3 exhibited phase separation, with a clear aqueous layer on top and a precipitated emulsion layer at the bottom. This separation resulted from destabilization during emulsion preparation. Destabilization causes aggregation and coalescence of oil droplets, which are normally stabilized by emulsifiers, leading to separation of the aqueous phase and deposition of emulsion components, thereby forming distinct layers. This phenomenon indicates poor emulsification and reduced long-term stability of the SAN resin-modified poly(styrene-acrylate) emulsion.

Figure 23:
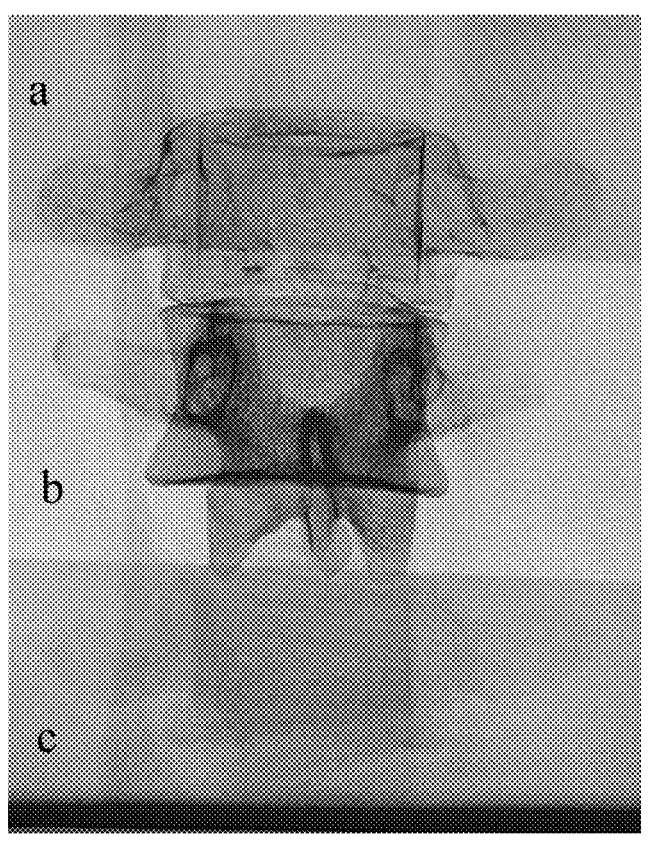
FIG. 23 is an X-ray image of Example 1, in which (a) corresponds to a bionic lumbar vertebra of Example 8, (b) corresponds to a real lumbar vertebra, and (c) corresponds to a bionic lumbar vertebra without a contrast agent coating.

FIG. 23 presents a comparison of X-ray imaging between a bionic lumbar vertebra (a) of Example 8, a real lumbar vertebra (b), and a bionic lumbar vertebra (c) without a contrast agent coating. As shown, the image of the bionic lumbar vertebra (c) exhibited almost no imaging effect, whereas the bionic lumbar vertebra (a) of Example 8 provided imaging closely resembling that of the real lumbar vertebra (b).

Based on the hardness data and X-ray imaging results, the SAN resin-modified SA emulsion exhibits tunable hardness and excellent X-ray imaging performance, making it suitable for use as a bionic bone coating. Additionally, the SAN resin-modified SA emulsion may also be used as an industrial X-ray inspection coating.

It will be obvious to those skilled in the art that changes and modifications may be made, and therefore, the aim in the appended claims is to cover all such changes and modifications.

What is claimed is:

1. A method for preparing a bionic spinal body, comprising:

S1: mixing and stirring rigid polyurethane foam raw materials to form a mixture, pouring the mixture into a lumbar vertebral mold, and foaming to obtain a cancellous bone core;

S2: blending a styrene-acrylic emulsion and a styrene-acrylonitrile emulsion to obtain a liquid material for a cortical bone layer; and S3: applying the liquid material onto an outer surface of the cancellous bone core by spraying or dipping, thereby forming the bionic spinal body.

2. The method of claim 1, wherein S1 comprises:

S101: mixing, in a mixing tank, 100 parts by weight of polyether polyol, 1 part of polydimethylsiloxane, 30 parts of 1,4-butanediol, 0.2 parts of triethylene diamine, 1 part of triethanolamine, 10 parts of trimethylolpropane, and 0.8 parts of deionized water at a stirring speed of 1000 rpm until uniform;

S102: while stirring in S101, slowly adding 170 parts by weight of polymeric methylene diphenyl diisocyanate, adjusting the stirring speed to 500 rpm, and rapidly stirring for 15 seconds to form a mixture; and S103: immediately pouring the mixture into the lumbar vertebral mold, sealing the lumbar vertebral mold, and curing at 25° C. for 24 hours to form the cancellous bone core in solid form.

3. The method of claim 2, wherein S2 comprises:

S201: mixing, in a first reactor, 10-20 parts by weight of styrene, 20-30 parts of acrylate monomer component, 0.5-1.5 parts of an emulsifier, 0.1-3.0 parts of a chain transfer agent, and 10-40 parts of deionized water to form a pre-emulsion;

S202: adding, in a second reactor, 10-60 parts by weight of deionized water, 0.5-3 parts of an initiator, 0.5-1.0 parts of an emulsifier, and 1-30 parts of a contrast agent, heating to 80° C. under stirring, and under a nitrogen atmosphere, dropwise adding the pre-emulsion prepared in S201, conducting emulsion polymerization for 1-2 hours, then cooling to room temperature to obtain the styrene-acrylic emulsion;

S203: mixing, in a third reactor, 30 parts by weight of styrene, 20 parts of acrylonitrile, 1.0 part of an emulsifier, 0.5 part of potassium persulfate, and 100 parts of deionized water, and conducting emulsion polymerization under stirring to obtain a styrene-acrylonitrile emulsion; and S204: stirring, in the second reactor, the styrene-acrylic emulsion prepared in S202, adding 5-40 parts by weight of the styrene-acrylonitrile emulsion prepared in S203, uniformly stirring, cooling to room temperature, and adding 0.1-1.0 parts of a pigment, thereby obtaining the liquid material for the cortical bone layer.

\* \* \* \* \*